US010241829B2

(12) United States Patent
    Aoyama et al.

(10) Patent No.: US 10,241,829 B2
(45) Date of Patent: Mar. 26, 2019

(54) INFORMATION PROCESSING DEVICE, INFORMATION PROCESSING METHOD, RECORDING MEDIUM, CALCULATION PROCESSING DEVICE, CALCULATION PROCESSING METHOD

(71) Applicant: NEC Corporation, Tokyo (JP)

(72) Inventors: Toshikazu Aoyama, Tokyo (JP); Teruyuki Imai, Tokyo (JP); Yasuo Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 25 days.

(21) Appl. No.: 15/035,065

(22) PCT Filed: Nov. 5, 2014

(86) PCT No.: PCT/JP2014/005561
    § 371 (c)(1),
    (2) Date: May 6, 2016

(87) PCT Pub. No.: WO2015/068382
    PCT Pub. Date: May 14, 2015

(65) Prior Publication Data
    US 2016/0371113 A1    Dec. 22, 2016

(30) Foreign Application Priority Data
    Nov. 8, 2013    (JP) .................................. 2013-232197

(51) Int. Cl.
    *G06F 9/48*    (2006.01)
(52) U.S. Cl.
    CPC ...... *G06F 9/4812* (2013.01); *G06F 2209/481* (2013.01)
(58) Field of Classification Search
    CPC .................................................... G06F 9/4812
    See application file for complete search history.

(56) References Cited

U.S. PATENT DOCUMENTS 6,304,963 B1   10/2001   Elwood
8,271,990 B2    9/2012   De et al.
                        (Continued)

FOREIGN PATENT DOCUMENTS

JP       6-19856    1/1994
JP    2000-29866    1/2000
JP   2008-165318    7/2008

OTHER PUBLICATIONS

Extended European Search Report in counterpart European Patent Application No. EP 14 86 0668.4, dated Jun. 19, 2017.

(Continued)

*Primary Examiner* — Charlie Sun
(74) *Attorney, Agent, or Firm* — Finnegan, Henderson, Farabow, Garrett & Dunner, L.L.P.

(57) ABSTRACT

The present invention resolves the problems of OS jitter and cache pollution, as well as the loss of versatility and increases in development cost. An information processing apparatus includes a control core on which an operating system is installed, and at least one calculation core which is controlled by the control core and performs a predetermined calculation process. The control core includes calculation core control unit for instructing the calculation core in halting, to start the calculation process to be performed by calculation core. The calculation core includes calculation processing control unit for controlling the calculation core so as to start the calculation process in response to an instruction, provided by the calculation core control unit, about starting the calculation process, and exception detection unit for detecting a preset exception process occurring during execution of the calculation process and halting the calculation process in which the exception process has occurred.

15 Claims, 14 Drawing Sheets

(56) References Cited

U.S. PATENT DOCUMENTS

| | | |
|---|---|---|
| 8,537,832 B2 | 9/2013 | Pirog et al. |
| 2005/0033881 A1* | 2/2005 | Yao ........................ G06F 9/4812 710/52 |
| 2010/0274941 A1* | 10/2010 | Wolfe .................... G06F 9/4812 710/269 |
| 2011/0225589 A1* | 9/2011 | Pirog ..................... G06F 9/3851 718/102 |
| 2012/0121984 A1 | 5/2012 | Oka et al. |
| 2013/0138850 A1 | 5/2013 | Yamashita et al. |
| 2014/0351618 A1* | 11/2014 | Connell ................. G06F 1/3265 713/323 |

OTHER PUBLICATIONS

Notification of First Office Action dated Jun. 22, 2018, and an English-language translation, issued by The State Intellectual Property Office of the People's Republic of China in counterpart Chinese Patent Application No. 201480061338.6.
T. Nagata et al., "SPE Observer: An OS Monitoring System Running on an SPE in Cell/B.E.", SIG Technical Report, vol. 2012-OS-120, No. 2, pp. 1-8, Feb. 2012.
International Search Report and Written Opinion dated Feb. 10, 2015, in corresponding PCT International Application.

* cited by examiner

Fig. 5

| CALCULATION PROCESS ID | ALLOCATED CALCULATION CORE NUMBER |
|---|---|
| 31996 | Core#0 |
| 32019 | Core#1 |
| 32020 | NONE |
| ... | ... |

Fig. 6

| CALCULATION PROCESS ID | PROCESS STATUS | PROXY PROCESS ID | REGISTER A | REGISTER B | REGISTER C | ... |
|---|---|---|---|---|---|---|
| 31996 | BLOCKED | 31996 | 0xDEADBEEF | 0xBAADF00D | 0xBADDCAFE | ... |
| 32019 | READY | 32019 | 0xDEADBEEE | 0xBAADF00E | 0xBADDCAFD | ... |
| 32020 | ENDED | 32020 | 0xDEADBEED | 0xBAADF00F | 0xBADDCAFC | ... |
| ... | ... | ... | ... | ... | ... | ... | though
INFORMATION PROCESSING DEVICE, INFORMATION PROCESSING METHOD, RECORDING MEDIUM, CALCULATION PROCESSING DEVICE, CALCULATION PROCESSING METHOD

CROSS-REFERENCE TO RELATED PATENT APPLICATIONS

This application is a National Stage Entry of International Application No. PCT/JP2014/005561, filed Nov. 5, 2014, which claims priority from Japanese Patent Application No. 2013-232197, filed Nov. 8, 2013. The entire contents of the above-referenced applications are expressly incorporated herein by reference.

TECHNICAL FIELD

The present invention relates to an information processing apparatus, information processing method, recording medium, calculation processing apparatus, and calculation processing method and, in particular, to an information processing apparatus, information processing method, program, calculation processing apparatus, and calculation processing method which are for parallel computations with a plurality of processors.

BACKGROUND ART

NUMA (Non-Uniform Memory Access) type parallel computers where a plurality of nodes each including a processor-memory pair are connected through an interconnect are known. The NUMA-type parallel computer is a system having non-uniform access costs between an access to a local memory belonging to the processor's node and an access to a remote memory belonging to another node.

A known example of such parallel computers is the one which includes a plurality of clusters consisting of one or more processors and main memory used by the one or more processors, wherein part of a virtual space of a process is provided with a communication region residing in real memory. This parallel computer can reduce overhead for data communications between processes (PTL 1).

Another known example is the computer system having a control node and a computation node, wherein the computation node can be configured to execute remote processes only (PTL 2).

CITATION LIST

Patent Literature

[PTL 1] Japanese Unexamined Patent Application Publication No. 06-019856
[PTL 2] Japanese Unexamined Patent Application Publication No. 2008-165318

SUMMARY OF INVENTION

Technical Problem

In general, interrupt processes occur on such parallel computers caused by an interference (e.g., a timer interrupt) from system control programs such as an operating system (OS). This may result in non-uniform speeds at which applications run among nodes. Consequently, a processor may need to wait for synchronization with other processors to cause a problem called OS jitter, which slows execution of parallel programs.

In addition, some data not used by application programs may be stored in a cache due to memory access occurring during an OS process such as a kernel process. As a result, any data to be used by an application program may be evicted from the cache, which is a problem called cache pollution.

Solutions to such problems may include, for example, restricting locks on a symmetric multiple processor (SMP) computer to limit the processors that execute system calls or using a microkernel-based distributed OS. However, these methods, i.e., transferring authority of (offloading) an OS function from one node to another, require development of a device driver dedicated to each input/output (I/O) device to be connected. Conventionally, this makes it difficult to support various devices.

An alternative way to alleviate such problems may be employing an accelerator-type computer. However, an OS does not run on an accelerator-type computer. For this reason, accelerator-type computers are not provided with APIs (application programming interfaces) (e.g., POSIX (Portable Operating System Interface for UNIX(registered-trademark) API) that are complied with by widespread programming languages (e.g., the C language), and thus have no capability to perform basic system controls. Hence, for accelerator-type computers, a specialized language must be used for development, which makes it difficult to utilize existing programming assets. In addition, optimization of programming assets may sometimes involve difficulties.

Techniques to reduce OS development costs may include virtualization by using a virtual machine. For example, the need for developing an OS or device driver is eliminated by introducing a virtual machine emulating a commodity architecture into a computer of an architecture different from the commodity architecture. Generally, a virtual machine is simpler than a typical OS. Thus, introducing a virtual machine is supposed to achieve reduction in development costs. However, virtualization based on a virtual machine creates overhead due to emulation by the virtual machine. In addition, virtualization based on a virtual machine offers no solution to the above-described problems of OS jitter and cache pollution.

As seen above, parallel computers pose problems of OS jitter and cache pollution. Efforts to solve these problems have conventionally caused other problems such as loss of versatility and a increase in development cost.

Accordingly, an object of the present invention is to provide an information processing apparatus that provide solutions to the above-described problems: OS jitter and cache pollution in a parallel computer as well as loss of versatility and a increase in development cost.

Solution to Problem

To achieve the object, an information processing apparatus according to one aspect of the present invention, includes a control core on which an operating system is installed; and at least one calculation core which is controlled by the control core and performs a predetermined calculation process. The control core includes calculation core control unit for instructing the calculation core, which is in halt, to start the calculation process to be performed by calculation core. And the calculation core includes: calculation processing control unit for controlling the calculation core so that the calculation core starts the calculation process in response to an instruction, which is provided by the calculation core control unit, to start the calculation process; and exception detection unit for detecting a preset exception process occurring during execution of the calculation process and halting the calculation process in which the exception process has occurred.

A computer-readable recording medium according to another aspect of the present invention stores a program for a computer including an information processing apparatus, which includes: a control core on which an operating system is installed; and at least one calculation core which is controlled by the control core and which performs a predetermined calculation process. The program causes the computer to perform: a calculation core control process of instructing the calculation core, which is in halt, to start the calculation process to be performed by the calculation core; a calculation processing control process of controlling the calculation core so that the calculation core starts the calculation process in response to an instruction to start the calculation process; and an exception detection process of detecting a preset exception process occurring during execution of the calculation process and halting execution of the calculation process in which the exception process has occurred.

An information processing method according to another aspect of the present invention includes: starting, by a calculation core, a calculation process that is predetermined in response to an instruction provided by a control core to start the calculation process; and when a preset exception process occurs during execution of the calculation process performed by the calculation core, detecting, by the calculation core, the exception process, and halting, by the calculation core, the calculation process in which the exception process has occurred.

A calculation apparatus according to another aspect of the present invention is a calculation apparatus which performs a predetermined calculation process under control of an external apparatus, the calculation processing apparatus including: calculation processing control unit for controlling the calculation processing apparatus so that the calculation processing apparatus starts a calculation process, in response to an instruction provided by the external apparatus to start the calculation process; and exception detection unit for detecting a preset exception process occurring during execution of the calculation process and halting execution of the calculation process in which the exception process has occurred.

A computer-readable storage medium according to another aspect of the present invention stores a program which causes a calculation processing apparatus to perform: a calculation processing control process of controlling the calculation processing apparatus so that the calculation processing apparatus starts, in response to an instruction provided by an external apparatus to start a calculation process, the calculation process; and an exception detection process of detecting a preset exception process occurring during execution of the calculation process and halting execution of the calculation process in which the exception process has occurred.

A calculation processing method according to another aspect of the present invention includes: starting a calculation process that is predetermined, in response to an instruction provided by an external apparatus to start the calculation process; and when a preset exception process occurs during execution of the calculation process, detecting the exception process and halting the calculation process in which the exception process has occurred.

Advantageous Effects of Invention

With the above-described configurations, the present invention can provide an inexpensive and general-purpose information processing apparatus which resolves the problems of OS jitter and cache pollution.

BRIEF DESCRIPTION OF DRAWINGS

FIG. 5 is a table showing an example of mapped data stored in a process association table according to the first exemplary embodiment.

FIG. 6 is a table showing an example of data stored in a calculation process DB according to the first exemplary embodiment.

DESCRIPTION OF EMBODIMENTS

<Exemplary Embodiment 1>

Figure 1:
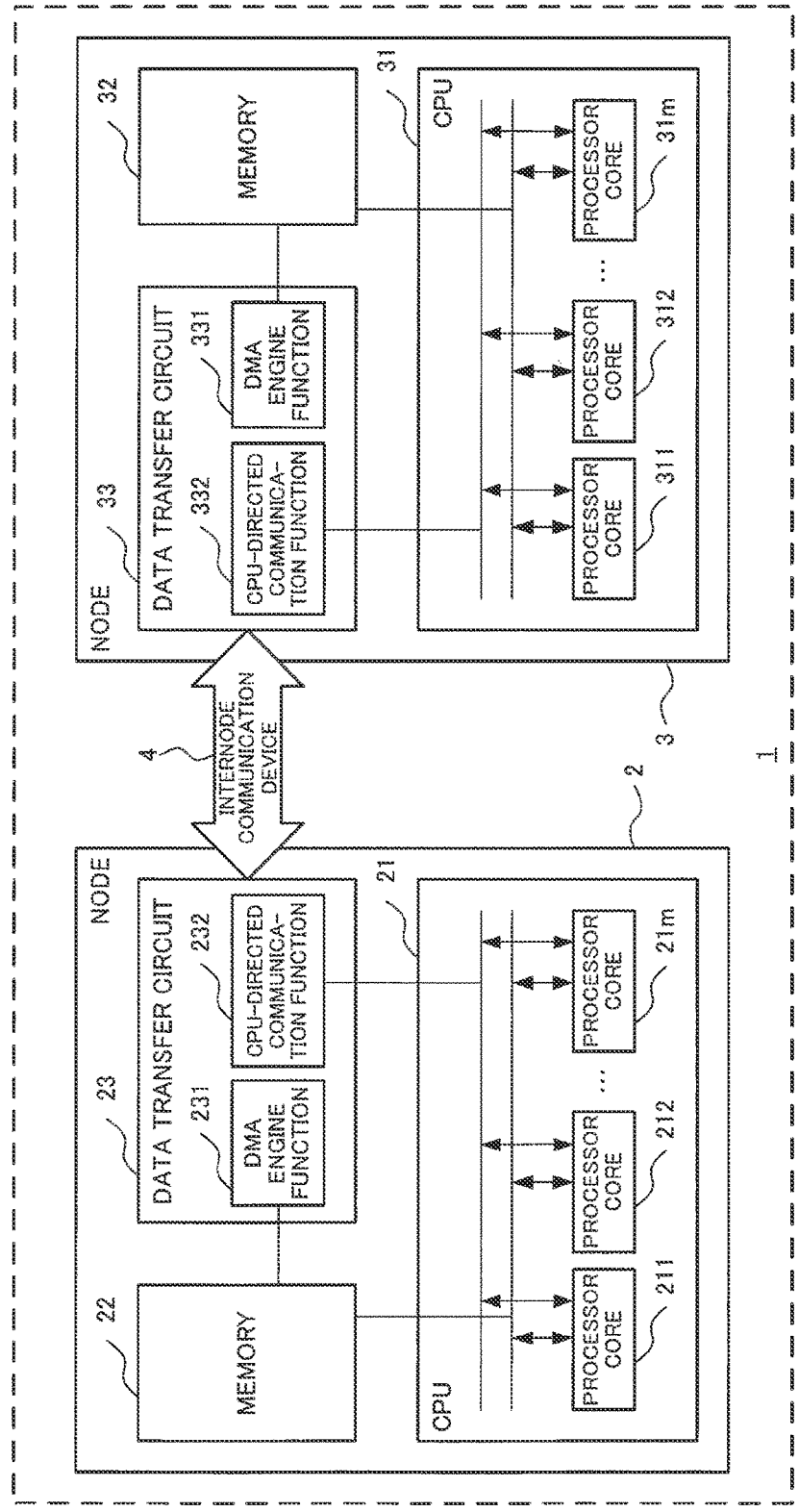
FIG. 1 is a block diagram illustrating a configuration of a parallel computer contemplated in a first exemplary embodiment.
Figure 2:
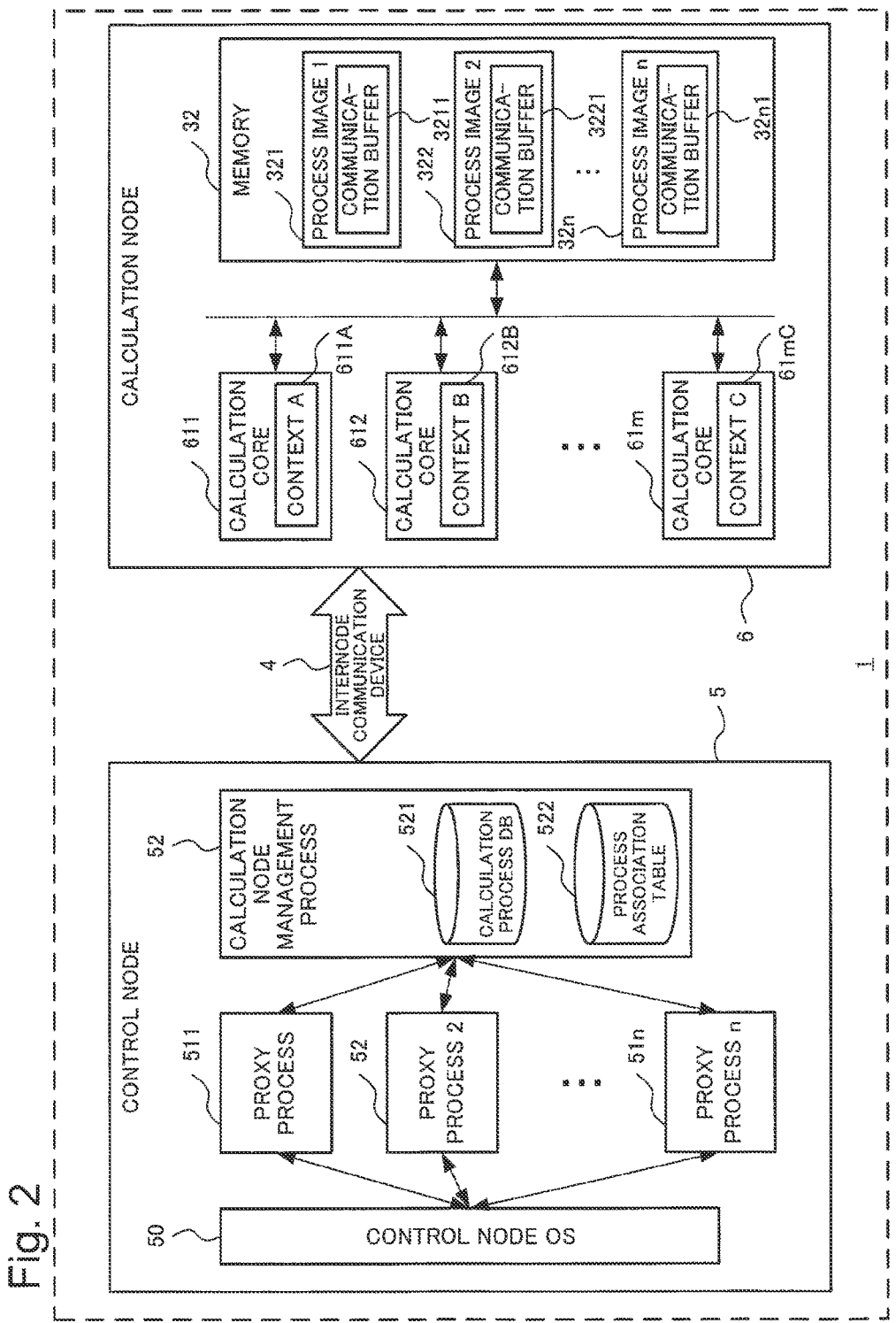
FIG. 2 is a block diagram illustrating a configuration of the parallel computer according to the first exemplary embodiment.
Figure 3:
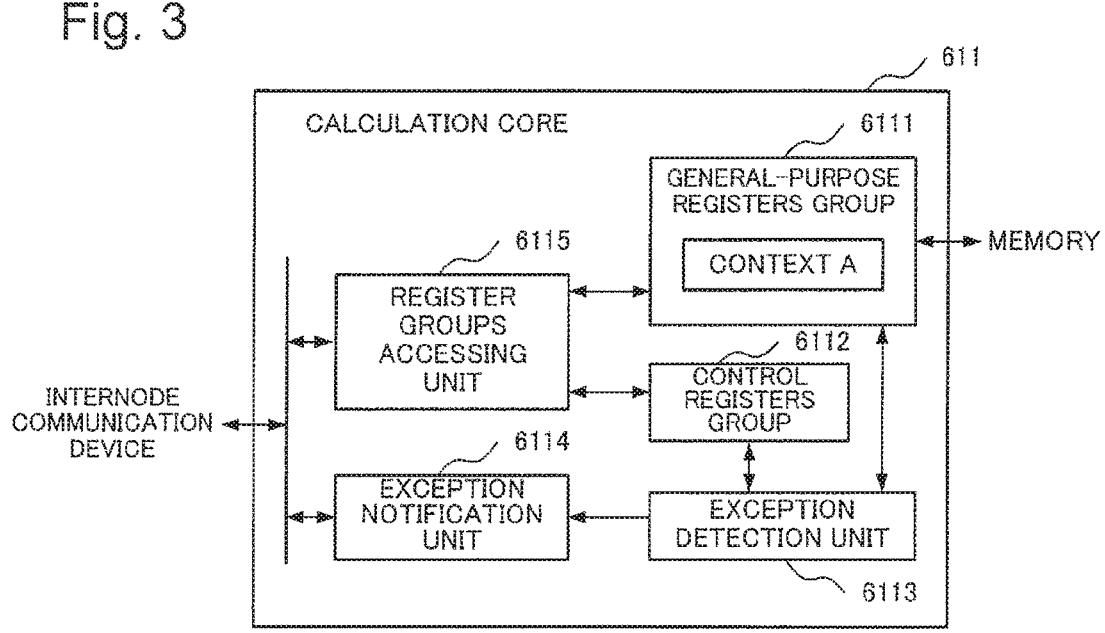
FIG. 3 is a block diagram illustrating a configuration of the calculation core included in the calculation node depicted in FIG. 2.
Figure 4:
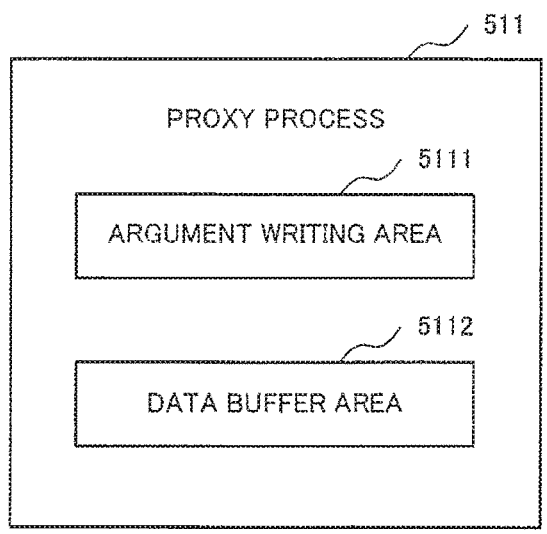
FIG. 4 is a functional block diagram illustrating a configuration of the proxy process depicted in FIG. 2.
Figure 7:
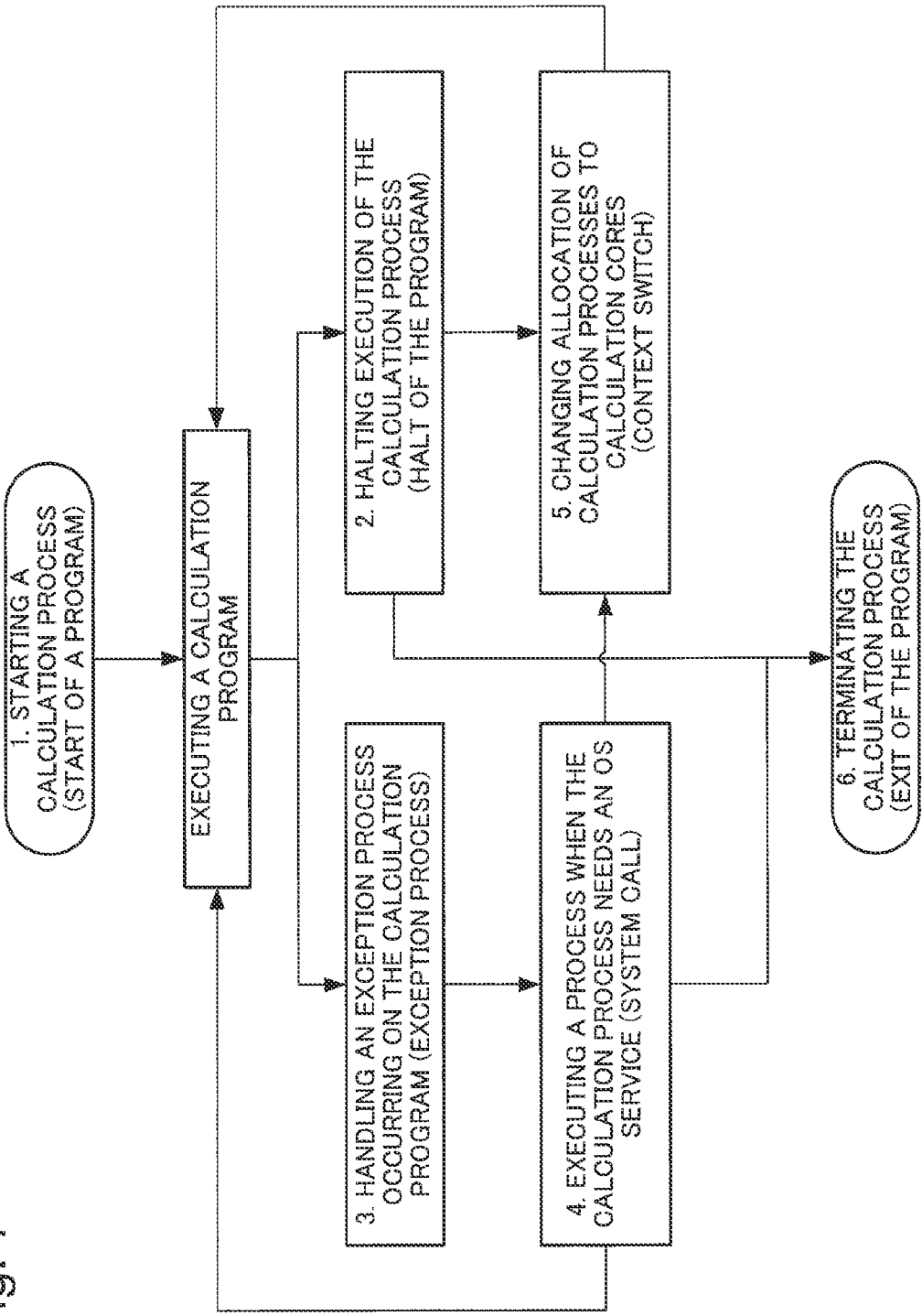
FIG. 7 is a flow chart showing how operations required during a calculation process from its start to its end have effects in the first embodiment.

A first exemplary embodiment of the present invention will now be described with reference to FIGS. 1 to 13. FIG. 1 is a block diagram illustrating a configuration of a parallel computer 1 contemplated in the present exemplary embodiment. FIG. 2 is a block diagram illustrating a configuration of the parallel computer 1 according to the present exemplary embodiment. FIG. 3 is a block diagram illustrating a configuration of a calculation core 611 included in a calculation node 6. FIG. 4 is a functional block diagram illustrating a configuration of a proxy process 511. FIG. 5 is a table showing an example of mapped data stored in a process association table 522. FIG. 6 is a table showing an example of data stored in a calculation process DB 521. FIG. 7 is a flow chart showing how operations required during a calculation process from its start to its end have effects in the first embodiment. FIGS. 8 to 13 are flow charts showing operations required during a calculation process from its start to its end.

(Configuration)

As a first exemplary embodiment, the parallel computer 1 having NUMA-type memory will now be described. The term NUMA represents a configuration where a plurality of nodes each consisting of a memory-processor pair are connected to one another through an interconnect. The parallel computer 1 according to the present exemplary embodiment may be used, for example, in the field of high performance computing (HPC).

First, a basic configuration of the parallel computer 1 according to the present exemplary embodiment is described with reference to FIG. 1. As illustrated in FIG. 1, the parallel computer 1 of the present exemplary embodiment includes a node 2 and a node 3. The node 2 includes a central processing unit (CPU) 21, memory 22, and a data transfer circuit 23. The node 3 includes a CPU 31, memory 32, and a data transfer circuit 33. The nodes 2 and 3 are communicably connected with each other via an internode communication device 4 (including part of the data transfer circuits).

The nodes 2 and 3 included in the parallel computer 1 according to the present exemplary embodiment are respectively configured to include the CPU (21 or 31), the memory (22 or 32), and the data transfer circuit (23 or 33). The nodes 2 and 3 are each configured in the same manner. Thus, the following describes how the node 2 is configured.

It should be noted that, although the parallel computer 1 described in the present exemplary embodiment includes two nodes, the parallel computer 1 according to the present exemplary embodiment may be configured to include two or more nodes. In addition, the nodes may employ different architectures such as x86 and ARM(registered-trademark).

The CPU 21 is configured to include one or more processor cores. In the present exemplary embodiment, the CPU 21 includes multiple processor cores, namely processor cores 211, 212, ..., and 21m (where m is a natural number), all of which are hereinafter called processor core(s) 211 unless individually identified). Each processor core 211 includes communication paths to/from the memory 22 and the data transfer circuit 23. In other words, each of the processor cores 211 included in the CPU 21 is configured to be able to communicate with the memory 22 and with the data transfer circuit 23.

The memory 22 stores data, programs to be executed, and the like. The memory 22 is shared by the plurality of processor cores 211 (processor cores in the same node) included in the CPU 21. The memory 22 according to the present exemplary embodiment is configured in the form of semiconductor memory such as random access memory (RAM).

The data transfer circuit 23 is configured to include two functions, i.e., a direct memory access (DMA) engine function 231 and a CPU-directed communication function 232. The DMA engine function 231 is a function to access the memory 22 bypassing the CPU 21. The CPU-directed communication function 232 is a function to access registers and other resources on the CPU 21. In other words, the data transfer circuit 23 includes a function to access the memory 22 bypassing the CPU 21 and a function to access registers and other resources on the CPU 21. Note that the CPU-directed communication function 232 may be configured to allow registers and other resources on the CPU 21 to be allocated to a memory space to which the DMA engine function 231 will make access.

The configuration of the node 2 included in the parallel computer 1 according to the present exemplary embodiment has been described above. As mentioned above, the node 3 is configured in the same manner as the node 2. That is, the node 3 includes the CPU 31, the memory 32, and the data transfer circuit 33. The CPU 31 includes a plurality of processor cores, namely processor cores 311, 312, ..., and 31m (all of which are hereinafter called processor core(s) 311 unless individually identified). The data transfer circuit 33 includes the DMA engine function 331 and the CPU-directed communication function 332. Details of each configuration have been described with respect to the node 2 and are thus omitted here.

As described above, the nodes 2 and 3 are communicably connected with each other via the internode communication device 4. The internode communication device 4 can be implemented with, for example, an interconnect having a DMA function (such as PCI (Peripheral Components Interconnect) Express or InfiniBand) or a Remote DMA (RDMA) function as well as with transmission lines.

In the present exemplary embodiment, the plurality of nodes included in the parallel computer 1 are distinguished by calling one node "control node" and any other node (any node other than the control node) "calculation node". In other words, the parallel computer 1 according to the present exemplary embodiment is composed of one control node and one or more calculation nodes. Additionally, in the parallel computer 1 according to the present exemplary embodiment, the control node has OS functions while the calculation node(s) have no OS function.

Like a general OS, the control node has the capability to deploy a plurality of processes on a calculation node to perform calculation processes simultaneously. A process deployed on a calculation node by the control node is hereinafter called a calculation process. As described later, a calculation process is generated upon starting an application program running on a calculation node and then discarded upon terminating the execution of the program.

The following provides a detail description of the parallel computer 1 referring to FIG. 2, assuming that the nodes 2 and 3 in FIG. 1 are the control node 5 and the calculation node 6, respectively, constituting the parallel computer. In the following description, processor cores 311 on the calculation node 6 are called calculation cores.

First, the configuration of the calculation node 6 is described below. OS is not running on the calculation node 6 (no OS is installed there) as mentioned above. As discussed later, the parallel computer 1 according to the present exemplary embodiment is configured so that the calculation node 6 where no OS is running can employ a calculation model implemented in general computers. In other words, the calculation node 6 achieves functions replacing services provided by a general OS, by sending/receiving data to/from the control node 5 via the internode communication device 4.

The calculation node 6 (which corresponds to the node 3 in FIG. 1) of the present exemplary embodiment is configured to include the CPU 31, the memory 32, and the data transfer circuit 33, as described above (see FIG. 1). The CPU 31 is configured to include a plurality of processor cores 311. The calculation node 6 includes a plurality of calculation cores 611, 612, ..., and 61m (all of which are hereinafter referred to as calculation core(s) 611 unless individually identified), as illustrated in FIG. 2.

As in the description above, the plurality of calculation cores 611 in FIG. 2 are identical to their corresponding processor cores 311 in FIG. 1 (the processor cores 311 on the calculation node 6 are called calculation cores 611 as mentioned above). That is, the CPU 31 included in the calculation node 6 is configured to include a plurality of calculation cores 611. Each of the plurality of calculation cores 611 is configured to be able to communicate with the memory 32 and with the data transfer circuit 33. Note that there may be only one processor core 311, as described above. That is, the number of calculation cores 611 may be one. Detail configuration of the calculation core 611 will be described later.

The memory 32 is shared by calculation cores 611 in the same calculation node 6, as described above. As illustrated in FIG. 2, the memory 32 in the calculation node 6 is configured to store a plurality of pieces of data related to calculation processes. The pieces of data related to calculation processes as stored in the memory 32 are hereinafter called process images 321, 322, . . . , and 32n (where n is a natural number) (all of which are hereinafter called process image(s) 321 unless individually identified).

The process images 321 include communication buffer areas 3211, 3221, . . . , and 32n1, respectively (all of which are hereinafter called communication buffer area(s) 3211 unless individually identified), the communication buffer areas being used for reading and writing data for a calculation process from the control node 5. The architecture states of the calculation cores 611 manipulating the process images 321 are called contexts 611A, 612B, . . . , and 61mC (all of which are hereinafter referred to as context(s) 611A unless individually identified).

It is assumed that any total number of process images 321 can be stored in the memory 32 as far as the total volume of process images 321 does not exceed the capacity of the physical memory. The number of calculation cores 611 may not necessarily match the number of process images 321 stored in the memory 32.

As described above, no OS is running on the calculation node 6. For this reason, it is impossible to virtualize hardware (calculation core 611 and memory 32) on the calculation node 6 by using a system management function provided by an OS. Thus, calculation core 611 contains a context 611A for one calculation process. The calculation core 611 handles its calculation process by using the process image 321 which is stored in the memory 32 and mapped to the stored context 611A.

When the total number of process images 321 is greater than the total number of calculation cores 611, it is currently impossible to execute a context 611A that cannot be stored in the calculation core 611. In this case, the apparent total number of calculation cores 611 can be virtually increased by replacing the context 611A contained in a calculation core 611 with another context 611A. How the contexts 611A are interchanged (context switch) will be discussed in detail later.

The data transfer circuit 33 functions in the same way as in the node 2 described above. Detail descriptions of the circuit are thus omitted.

The configuration of the calculation node 6 has been described above in detail. The configuration of a calculation core 611 will now be described in detail with reference to FIG. 3.

As illustrated in FIG. 3, the calculation core 611 is configured to include a general-purpose registers group 6111, a control registers group 6112 (calculation processing control unit), an exception detection unit 6113 (exception detection unit), an exception notification unit 6114 (exception detection unit), and a register groups accessing unit 6115 (part of the data transfer circuit). In addition, the calculation core 611 is configured to be able to communicate with the internode communication device 4 via the data transfer circuit 33. The calculation core 611 is also configured to be able to communicate with the memory 32.

The general-purpose registers group 6111 has a configuration similar to a general processor such as x86 or ARM. That is, the general-purpose registers group 6111 is composed of a program counter (PC), a general-purpose register (GPR) storing computation results, and the like.

This means execution of an instruction (a calculation process or program) in the calculation core 611 results in rewriting data stored in each register included in the general-purpose registers group 6111. In addition, execution of an instruction to load or store (such as reading or writing) in the calculation core 611 results in data transfer between a general-purpose register included in the general-purpose registers group 6111 and the memory 32.

The control registers group 6112 is composed of registers for controlling execution of an instruction performed by the calculation core 611. The control node 5 transmits "start of execution", a direction to execute an instruction, or "halt of execution", a direction to halt execution of an instruction, to the control registers group 6112 via the data transfer circuits 23 and 33 and via the internode communication device 4.

For example, suppose that the control node 5 has transmitted "start of execution" to the control registers group 6112. Then, the calculation core 611 starts a calculation process according to the contents of the general-purpose registers group 6111. Specifically, when the control registers group 6112 receives the direction "start of execution", the calculation core 611 fetches an instruction stored in the memory 32 according to the program counter value stored in the general-purpose registers group 6111. The calculation core 611 decodes and executes the fetched instruction. The calculation core 611 updates the contents of the general-purpose registers group 6111 and/or the memory 32, based on the instruction it has executed. The state where an instruction is being executed (a calculation process is in progress) by a calculation core 611 is referred to as "Instruction Executed State".

Also suppose that, for example, the control node 5 has transmitted "halt of execution" to the control registers group 6112. Then, the calculation core 611 stops any new execution of an instruction.

Consequently the calculation core 611 halts execution of any instruction. The state where the calculation core 611 has no instruction in progress while "halt of execution" has been transmitted is referred to as "Instruction Execution Halt State". Once the state shifts to Instruction Execution Halt State, the calculation core 611 does not execute any new instruction (calculation process) until the "start of execution" direction is provided by the control node 5 again.

The control registers group 6112 is configured so that the state of the calculation core 611 (Instruction Executed State or Instruction Execution Halt State) can be referenced from the control node 5. If, for example, the control registers group 6112 (the calculation core 611) has no function in order to be referenced, the calculation core 611 may be configured to notify the control code 5 of the state of a calculation core 611 by sending exception information as described later.

The exception detection unit 6113 is the part which detects any exception occurring during execution of an instruction by the control registers group 6112. Specifically, upon detection of any exception during execution of an instruction, the exception detection unit 6113 sends the "halt of execution" direction to the control registers group 6112. At the same time (or around that time), the exception detection unit 6113 gives to the exception notification unit 6114 a request for notification of the exception (notifies that an exception has occurred). The exception detection unit 6113 gives the request for exception notification to the exception notification unit 6114 by, for example, sending information about a detected exception to the exception notification unit 6114.

Exceptions detected by the exception detection unit 6113 may include, for example, exceptional operations such as a divide-by-zero computation exception. The exceptions may also include, for example, exceptions related to memory access such as out-of-bounds memory access, or exceptions provided on general processors such as software traps for invoking system calls. When any of these exceptions occurs when an instruction is being executed, the exception detection unit 6113 detects such exception.

The exception notification unit 6114 notifies the control node 5 of the halt of execution on the calculation core 611. Specifically, based on information about a detected exception received from the exception detection unit 6113, the exception notification unit 6114 gives notification of "halt of execution" on the calculation core 611 to the control code 5 via the internode communication device 4.

No limit is imposed on how to implement a method for notifying occurrence of an exception by the exception notification unit 6114, as far as the control node 5 is notified of the occurrence of the exception. Methods for implementing the exception notification unit 6114 may include, for example, using interrupt functions of the internode communication device 4 such as PCI Express MSI (Message Signaled Interrupts)/MSI-X (MSIExtended). For example, one possible method may be DMA writing to a pre-reserved memory area (the memory 22 included in the control node 5). If DMA writing to the memory 22 is employed as the method for notifying the control node 5 of occurrence of an exception, the control node 5 (the below-mentioned upper calculation node management process) uses a polling or similar process to monitor presence or absence of such notification provided from the calculation node 6.

Note that the exception notification unit 6114 may be configured to be prohibited from notifying the control node 5 of occurrence of an exception, such prohibition setting to be made from the control node 5 side. In preparation for the case where the exception notification unit 6114 is prohibited from notifying of occurrence of an exception, the control node 5 may be configured to be able to directly monitor (executes polling, for example) the state of execution in the control registers group 6112.

The register groups accessing unit 6115 reads and writes from/to each of the general-purpose registers group 6111 and the control registers group 6112, in accordance with an instruction transmitted from the control node 5. Both the general-purpose registers group 6111 and the control registers group 6112 send and receive data to/from the control node 5 via the register groups accessing unit 6115, the data transfer circuit 33, and the internode communication device 4.

The register groups accessing unit 6115 may be configured to be prohibited from writing/reading to/from the general-purpose registers group 6111 in the calculation core 611 being in the Instruction Executed State. In other words, the register groups accessing unit 6115 may be configured to be allowed to write/read to/from the general-purpose registers group 6111 only when the calculation core 611 is in the Instruction Execution Halt State. In this case, the action of the calculation core 611 in the Instruction Executed State when the register groups accessing unit 6115 accesses the general-purpose registers group 6111 is undefined (for example, the access is ignored).

The configuration of the calculation core 611 has been described above in detail. The following provides a detail description of the configuration of the control node 5.

The control node 5 is configured similarly to a general stand-alone computer system employing an OS. As described above, the control node 5 is configured to be able to provide services of OS functions to the calculation node 6.

The OS installed on the control node 5 is hereinafter called the control node OS 50. For the control node OS 50, any commodity OS used for general computers, including typical ones such as Linux(registered-trademark) and Windows(registered-trademark), may be used.

The control node 5 (which corresponds to the node 2 in FIG. 1) of the present exemplary embodiment is configured to include the CPU 21 (control core, proxy exception handling unit, and calculation core control unit), the memory 22, and the data transfer circuit 23, as described above (see FIG. 1). The CPU 21 is configured to include a plurality of processor cores 211.

As mentioned above, the control node OS 50 is running on the control node 5. For this reason, unlike the calculation node 6, it is possible to virtualize hardware (processor cores 211 and memory 22) on the control node 5 by using system management functions provided by the OS. Thus, the following describes the control node 5 with respect to process configurations referring to FIG. 2.

The control node 5 deploys a plurality of proxy processes 511, 512, . . . , and 51n (hereinafter referred to as proxy process(es) 511 unless individually identified; the proxy process 511 is equivalent to the proxy exception handling unit) and a calculation node management process 52 (which is equivalent to the calculation core control unit) on the control node OS 50. The calculation node management process 52 includes a calculation process database (DB) 521 and a process association table 522.

These processes can be realized by reading and executing programs stored in the memory 22, the reading and execution performed by the CPU 21 on the control node 5.

The proxy processes 511 are generated for their respectively corresponding calculation processes deployed on the calculation node 6. In other words, the proxy processes 511 are generated so as to correspond, on a one-to-one basis, to a plurality of process images 321 stored in the memory 32 on the calculation node 6. Accordingly, the number of proxy processes 511 deployed on the control node 5 is identical to the number of process images 321 stored in the memory 32 on the calculation node 6.

In the present exemplary embodiment, the proxy process 511 receives, via the internode communication device 4, a request to the OS sent from its corresponding calculation process on the calculation node 6. The proxy process 511 then performs the requested processing as a proxy of an OS that is expected to exist in the calculation node 6. In other words, the proxy process 511 is used for invoking a system call on behalf of the calculation node 6 having no OS, when the system call is needed to be invoked during execution of an instruction on the calculation core 611. For example, the proxy process 511 is used when a calculation process is started as will be discussed later.

As illustrated in FIG. 4, a proxy process 511 includes an argument writing area 5111 and a data buffer area 5112. As far as the data buffer area 5112 is concerted, the proxy process 511 may be configured to allocate the area on an as-needed basis.

The argument writing area 5111 is an area to which a system call number and an argument will be written. In addition, if a pointer is included in the system call argument, the data referenced by the pointer will be written to the argument writing area 5111. In general application binary interfaces (ABIs), a system call number and an argument are written to a general-purpose register or a stack on the processor core 311 (calculation core 611) at the time of invoking the system call. However, no OS is installed on the calculation core 611 of the present exemplary embodiment. Thus, on the system according to the present exemplary embodiment, the system call number and argument are written to the argument writing area 5111 in the proxy process 511.

The data buffer area 5112 is used for transferring a buffer from the calculation core 611 to the proxy process 511 when, for example, it is deemed necessary to transfer a buffer based on the contents of the system call. Buffer transfer is needed for a write system call, for example.

As seen above, the proxy process 511 is used when a system call is needed to be invoked on the calculation core 611. Both the argument writing area 5111 and the data buffer area 5112 are used before or after a software exception is generated, in order to transfer data needed for invoking a system call on the calculation core 611. Thus, the proxy process 511 is configured so that notification will be provided to the calculation core 611 before (or when) either of the two areas, the argument writing area 5111 and the data buffer area 5112, is needed. Consequently, the calculation core 611 can write appropriate data to either of the two areas when it needs to invoke a system call during execution of an instruction. After writing necessary data to either of the areas, the calculation core 611 generates a software exception. This configuration allows the calculation core 611 to make the control node 5 handle system calls.

The calculation node management process 52 is a process generated for the calculation node 6. The calculation node management process 52 manages hardware resources on the calculation node 6, such as calculation cores 611 (processor cores 311) and memory 32. In addition, the calculation node management process 52 acts as an interface for some resources to access from a proxy process 511 to a calculation core 611.

Specifically, for example, when the total number of calculation processes to be executed on the calculation node 6 exceeds the total number of calculation cores 611, the calculation node management process 52 makes allocation of calculation cores 611 for executing calculation processes. The calculation node management process 52 also manages the memory on the calculation node 6. In this way, the calculation node management process 52 performs operations that need mediation between processes.

To accomplish these operations, the calculation node management process 52 provides management so that hardware resources on the calculation node 6, such as calculation cores 611 and memory 32, are associated with virtualized resources, such as calculation processes and proxy processes.

Specifically, the calculation node management process 52 of the present exemplary embodiment manages these resources by storing, in the process association table 522, a proxy process 511 and a calculation core 611 associated with each other. FIG. 5 shows an example of associated pieces of data stored in the process association table 522.

As illustrated in FIG. 5, the process association table 522 according to the present exemplary embodiment stores a Calculation Process ID and an Allocated Calculation Core Number associated with each other. A Calculation Process ID is allocated to every proxy process 511 (calculation process) to identify each proxy process 511 or calculation process. An Allocated Calculation Core Number is allocated to a calculation core 611 to identify the calculation core 611 that is executing the calculation process indicated by a Calculation Process ID. In this way, the calculation node management process 52 can manage hardware resources and virtualized resources each associated with each other, by associating a proxy process 511 (calculation process) with a calculation core 611 that is executing the calculation process. If the calculation process is not allocated to any calculation core 611 (if the calculation process is not being executed by any calculation core 611), the Allocated Calculation Core Number field corresponding to the calculation process ID shows no calculation core number ("None" in FIG. 5).

The calculation node management process 52 manages information about calculation processes on the calculation node 6 by storing the information in the calculation process DB 521.

FIG. 6 shows an example of pieces of data stored in the calculation process DB 521. The example database shown in FIG. 6 is generated by saving, on the control node 5 side, the information that is stored by a calculation process in the general-purpose registers group 6111 on the calculation core 611.

As illustrated in FIG. 6, the calculation process DB 521 contains information about calculation processes in the form of items including Calculation Process ID, Process Status, Proxy Process ID, and individual registers included in the general-purpose registers group (Register A, Register B, Register C, and the like). The calculation process DB 521 may also contain, for example, information about memory regions already allocated. The column of the process status contains information about the status of a calculation process, indicating the calculation process is ready for operation", the calculation process has completed the operation", or the like. The columns of individual registers (Register A, Register B, Register C, etc.) contain values of the registers. Every row in the database table stored in the calculation process DB 521 corresponds to a context of a single calculation process.

Configurations of the processes deployed on the control node 5 have been described above. If there are a plurality of calculation nodes, a plurality of calculation node management processes 52 are generated for their respective calculation nodes.

Resources are listed below that can be accessed by the individual processes in the parallel computer 1 according to the present exemplary embodiment.

A calculation process can access its process image 321, its context 611A, and the argument writing area 5111 to which its proxy process 511 wrote data.

The proxy process 511 can access the resources that can be accessed by its corresponding calculation process and all the resources that can be accessed by a process on the control node 5. That is, the proxy process 511 can access a process image 321 and a context 611A. Resources that can be accessed by a process on the control node 5 include, for example, files in a file system existing on the control node 5.

The calculation node management process 52 can access all the resources on the calculation node 6, the calculation process DB 521, and the process association table 522. In addition, the calculation node management process 52 has the ability to notify any proxy process 511 that an exception has been generated by a calculation process.

All the resources on the calculation node 6 include the whole memory 32 on the calculation node 6, as well as the general-purpose registers group 6111 and the control registers group 6112 in every calculation core 611 on the calculation node 6. Since the calculation node management process 52 can access the whole memory 32 on the calculation node 6, the process 52 has an access right to process images 321 for all the calculation processes.

The calculation node management process 52 can also access the calculation process DB 521, as described above. Accordingly, the calculation node management process 52 has an access right to contexts 611A for all the calculation processes.

Note that the calculation node management process 52 is not necessarily authorized to access the resources held by a proxy process 511, such as a memory region or context of the proxy process 511.

The configuration of the parallel computer 1 according to the present exemplary embodiment has been described above. With such configuration, it is made possible to construct an inexpensive and versatile parallel computer which resolves the problems of OS jitter and cache pollution.

Operations of the parallel computer 1 according to the present exemplary embodiment will now be described with reference FIGS. 7 to 13.

(Operation)

FIG. 7 is a flow chart showing how operations required during a calculation process from its start to its end have effects, the calculation process being deployed on the parallel computer 1 configured as above. As illustrated in FIG. 7, the following operations are needed to deploy a calculation process (start a calculation process and then terminate the process) on the parallel computer 1.
1. Starting a calculation process (start of a program)
2. Halting execution of the calculation process (halt of the program)
3. Handling an exception process occurring on the calculation process (exception process)
4. Executing a process when the calculation process needs an OS service (system call)
5. Changing allocation of calculation processes to calculation cores (context switch)
6. Terminating the calculation process (exit of the program)

Once a calculation process is started, the calculation core 611 keeps executing a program (instruction or calculation process) until the running program is exited, or halted by any of the above operations.

Implementing the above operations on the parallel computer 1 configured as above can provide services to the calculation node 6 as if there was an OS like POSIX API, without any OS on the calculation node 6. In other words, implementing the above operations allows the parallel computer 1 to cover process operations in an environment provided with a general OS. Each of the operations above will now be described in detail.

Figure 8:
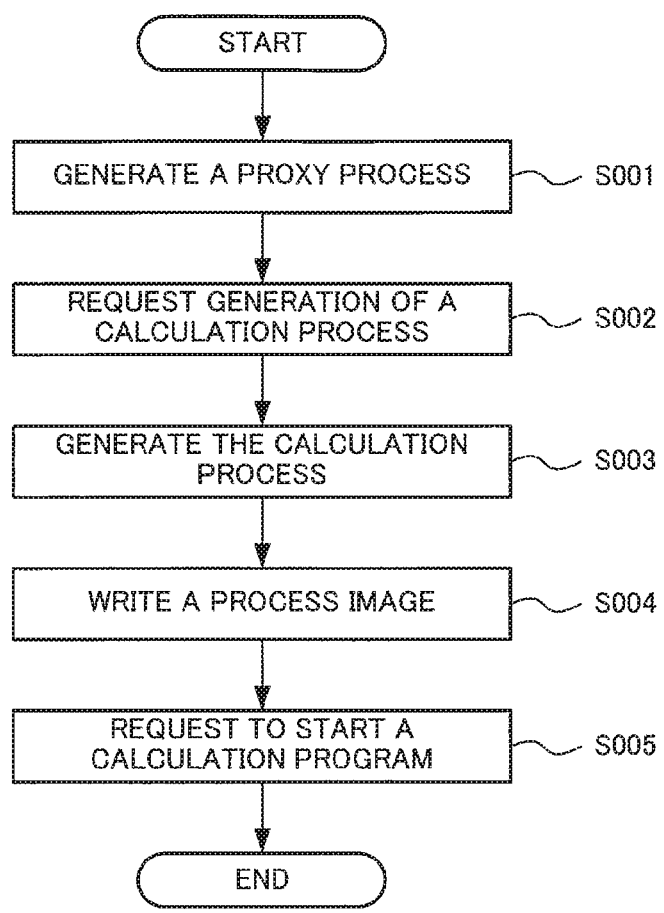
FIG. 8 is a flow chart showing operations performed when a calculation process is started.

First, operations of the parallel computer 1 performed during "1. Starting a calculation process (start of a program)" are described below with reference to FIG. 8. FIG. 8 is a flow chart showing example operations performed when program execution is started on the calculation node 6.

First, the control node OS 50 running on the control node 5 generates a proxy process 511 (Step S001).

Next, the proxy process 511 passes its argument writing area 5111 to the calculation node management process 52. The proxy process 511 then requests the calculation node management process 52 to generate a calculation process which will execute a program (Step S002).

Upon receipt of the request for generating a calculation process, the calculation node management process 52 generates a calculation process (Step S003).

Specifically, the calculation node management process 52 generates a new context 611A. The calculation node management process 52 generates a process image 321 related to the calculation process in the memory 32 on the calculation node 6. The calculation node management process 52 adds to the calculation process DB 521 the context 611A that has been generated as above and is associated with the proxy process 511. The calculation node management process 52 associates the context 611A that has been added to the calculation process DB 521 as above with the argument writing area 5111 passed from the proxy process 511, and then adds the contents of the argument writing area 5111 to the context 611A. The calculation node management process 52 generates a calculation process in this manner.

The calculation node management process 52 then returns a handle for accessing the generated calculation process to the proxy process 511. The handle may be, for example, an ID provided by the calculation node management process 52, a process ID, or a file descriptor. As part of a handle, a region mapped to the process image 321 by mmap, or a pointer to the mapped region may be included.

Then, the proxy process 511 writes the program to be executed on the calculation node 6 and the data to be used for executing the program to the process image 321 in the memory 32 which is included in the calculation node 6 (Step S004).

Specifically, first, the proxy process 511 reads the program to be executed by a calculation core 611. The program is read by, for example, invoking a read system call from the control node OS 50 if the program to be executed by the calculation process is stored in a file.

Next, the proxy process 511 uses the handle passed from the calculation node management process 52 to put the program to be executed by the calculation core 611 in the process image 321 on the memory 32 at the location specified by the program. For example, if the handle includes a region memory-mapped to the process image 321, the proxy process 511 issues the memory store directly to the location specified by the program. Alternatively, for example, if the handle is an ID provided by the calculation node management process 52, a process ID, a file descriptor, or the like, the proxy process 511 passes to the calculation node management process 52 the location on the process image 321 along with the contents to be written. The proxy process 511 then requests the calculation node management process 52 to write to the process image 321.

In addition, the proxy process 511 sets an initial value as a register value in the context 611A stored in the calculation process DB 521.

Then, the proxy process 511 requests for starting execution of the calculation program (Step S005). Specifically, the proxy process 511 uses the handle obtained from the calculation node process 52 to change the status of the calculation process to Ready for Execution. Changing the status of the calculation process to Ready for Execution allows an available calculation core 611 (in a state other than the Instruction Executed State) on the calculation node 6, if any, to start executing the program. This operation will be described later in detail (see Step S055).

Figure 9:
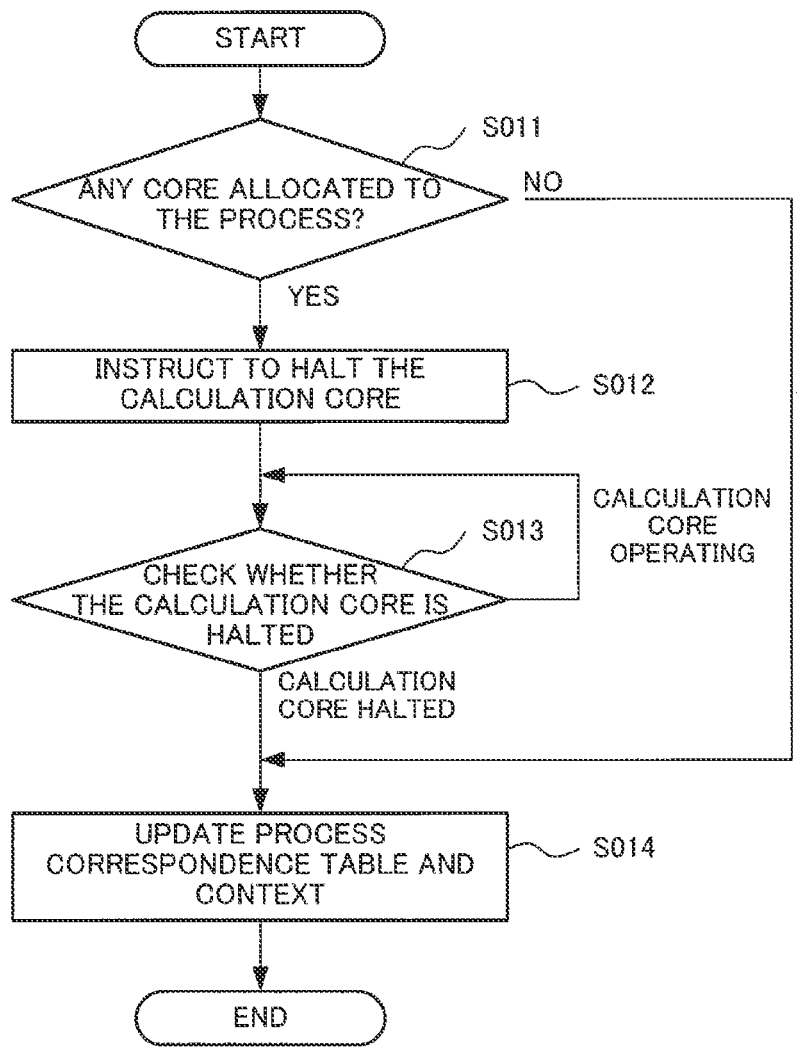
FIG. 9 is a flow chart showing operations performed when execution of a calculation process is halted.

Operations of the parallel computer 1 performed during "1. Starting a calculation process (start of a program)" have been described above. Next, operations of the parallel computer 1 performed during "2. Halting execution of the calculation process (halt of the program)" are described below with reference to FIG. 9. FIG. 9 is a flow chart showing example operations performed when the calculation core 611 corresponding to the proxy process 511 is halted from the control node 5 side.

First, the calculation node management process 52 references the process association table 522, then the process 52, using the Calculation Process ID which identifies the calculation process associated with the process image 321 to be halted, obtains the Allocated Calculation Core Number associated with that Calculation Process ID.

If the calculation process has no calculation core 611 allocated (No in Step S011), the calculation node management process 52 skips Steps S012 and S013, which are described below, and updates the status of the context in the calculation process DB 521 (Step S014). In other words, when the calculation node management process 52 fails to find any Allocated Calculation Core Number associated with the Calculation Process ID, the process 52 updates the status of the context in the calculation process DB 521 without performing Steps S012 and S013.

On the other hand, if the calculation process has an allocated calculation core 611 (Yes in Step S011), the calculation node management process 52 gives an instruction to halt the calculation core 611 to the control registers group 6112 via the register groups accessing unit 6115 on the calculation core 611 (Step S012). In other words, if the calculation process has an allocated calculation core 611, the calculation node management process 52 gives the "halt of execution" instruction to the control registers group 6112.

Then, the calculation node management process 52 checks the control registers group 6112 via the register groups accessing unit 6115 to find the operational status of the calculation core 611 (Step S013). If the calculation node management process 52 does not see the calculation core 611 in the Instruction Execution Halt State, that is, if the calculation core 611 is still in the Instruction Executed State ("Calculation core operating" in Step S013), the process 52 checks the operational state of the calculation core 611 again after a predetermined time has passed.

If the calculation node management process 52 finds the calculation core 611 to be in the Instruction Execution Halt State ("Calculation core halted" in Step S013), the process 52 updates the row that includes the halted calculation core number (under Allocated Calculation Core Number) in the process association table 522. In addition, the calculation node management process 52 updates the calculation process DB 521 to change the status of the context 611A that includes the calculation process ID associated with that allocated calculation core number (Step S014).

Figure 10:
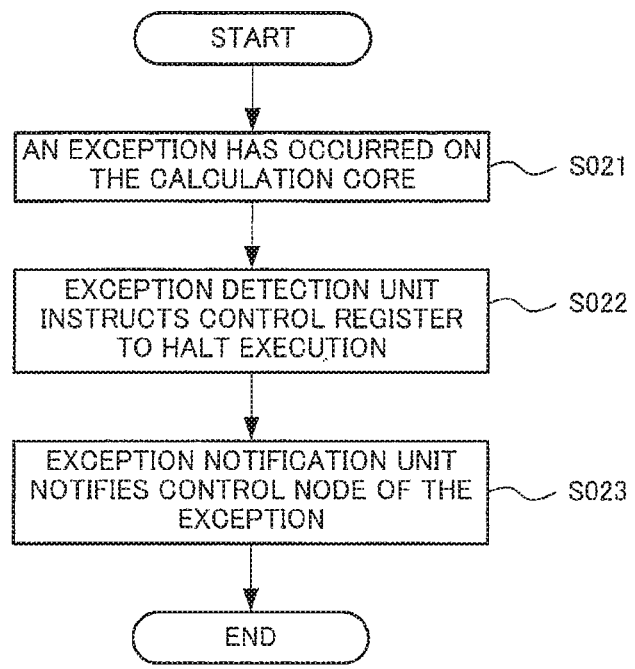
FIG. 10 is a flow chart showing operations performed when an exception occurring on a calculation process is handled.

Operations of the parallel computer 1 performed during "2. Halting execution of the calculation process (halt of the program)" have been described above. Next, operations of the parallel computer 1 performed during "3. Handling an exception process occurring on the calculation process (exception process)" are described below with reference to FIG. 10. FIG. 10 is a flow chart showing example operations for handling an exception that has occurred during execution of a program (instruction or calculation process) by the calculation core 611.

It is assumed here that an exception has occurred when the calculation core 611 is executing a program (Step S021). Definition of an exception is omitted because it is already provided in the description of how the parallel computer 1 is configured.

The exception detection unit 6113 detects the exception that has occurred. The exception detection unit 6113 then gives the "halt of execution" instruction to the control registers group 6112 (Step S022).

Next, the exception detection unit 6113 notifies the exception notification unit 6114 that an exception has occurred. Upon receipt of the notification of the exception from the exception detection unit 6113, the exception notification unit 6114 notifies the calculation node management process 52 in the control node 5 that an exception has occurred (Step S023). The exception notification unit 6114 can notify that an exception has occurred by using a variety of methods as described above. The methods may include, for example, notification by using an I/O exception function included in the internode communication device 4, writing to the control node 5 by using a DMA function, and monitoring, from the control node 5, registers on the calculation node 6. Any of these methods may be used to implement the exception notification unit 6114.

Figure 11:
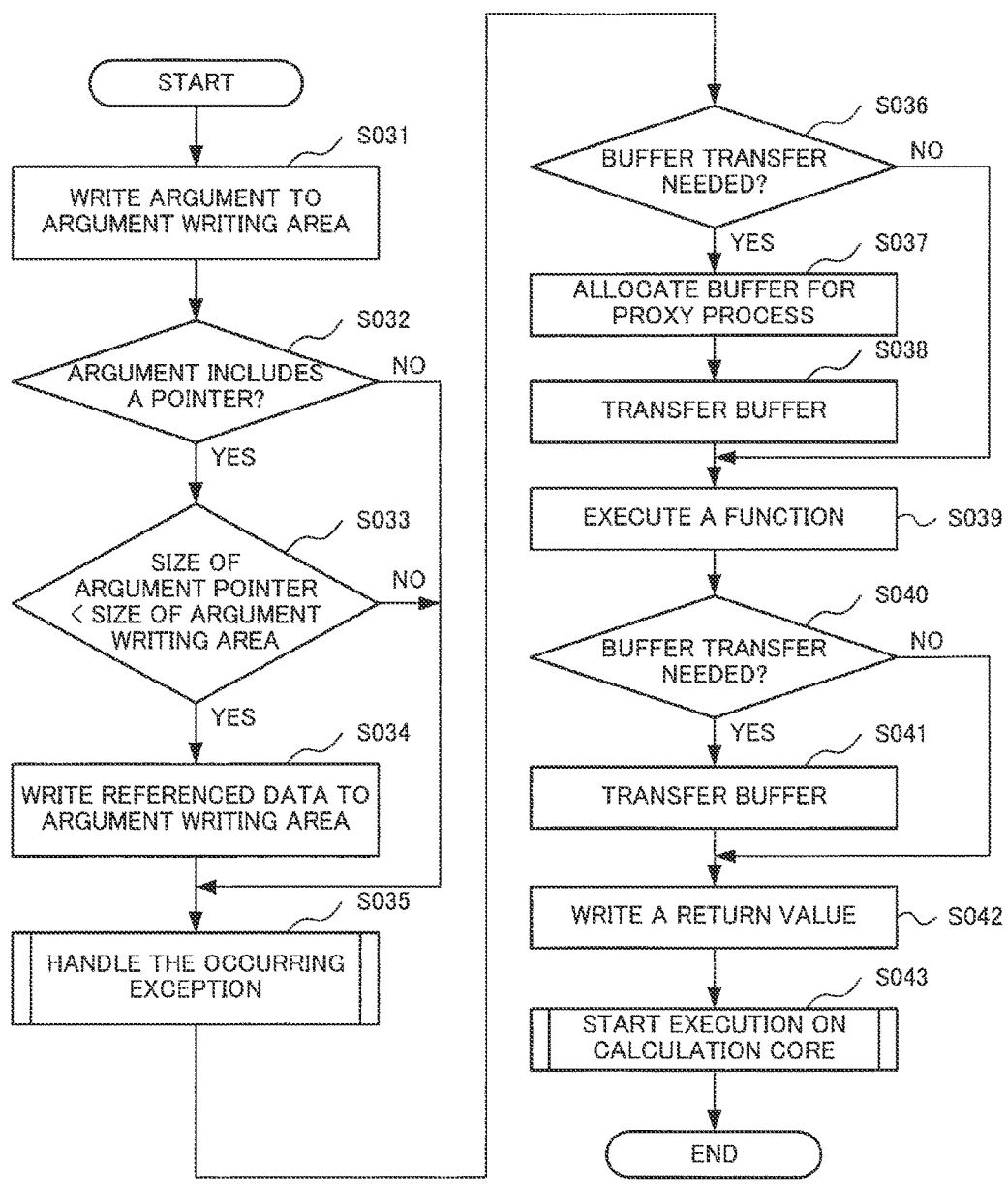
FIG. 11 is a flow chart showing operations performed when a calculation process needs an OS service.

Operations of the parallel computer 1 performed during "3. Handling an exception process occurring on the calculation process (exception process)" have been described above. Next, operations of the parallel computer 1 performed during "4. Executing a process when the calculation process needs an OS service (system call)" are described below with reference to FIG. 11. FIG. 11 is a flow chart showing example operations performed for handling a system call invoked on the calculation node 6.

In general application binary interfaces (ABIs), when a system call is invoked while a process image 321 is operating on a calculation core 611, the system call number and an argument are written to general-purpose registers or a stack on the processor core 311 (calculation core 611). However, no OS is installed on the calculation core 611 of the present exemplary embodiment. Thus, the process image 321 needs to perform the operations described later.

First, the calculation process according to the present exemplary embodiment writes a system call number and an argument to the argument writing area 5111 in the proxy process 511 (Step S031).

The proxy process 511, to which the system call number and argument are now written, determines whether a pointer exists in the argument of the system call to be invoked (Step S032). If there is no pointer in the argument (No in Step S032), Steps S033 and S034 (these steps will be described later) are skipped, and then the calculation core 611 performs the processing in Step S035, which will also be described later. If there is a pointer in the argument (Yes in Step S032), the proxy process 511 proceeds to determine whether the data referenced by the pointer is smaller than the argument writing area 5111 in size. The proxy process 511 may refer to the value of the argument specifying the size in order to determine the size of the referenced data. Alternatively, the proxy process 511 may use the type of the argument to determine the size (Step S033).

If the data referenced by the pointer is equal to or greater than the argument writing area 5111 in size (No in Step S033), Step S034 (which will be described later) is skipped, and then the calculation core 611 performs the processing in Step S035, which will also be described later. If the type referenced by the pointer is smaller than the argument writing area 5111 in size (Yes in Step S033), the proxy process 511 writes the data referenced by the pointer to the argument writing area 5111 (Step S034).

Then, the calculation core 611 generates a system call exception (Step S035). In general, a system call exception is handled within the same node (within the calculation node 6). However, in the parallel computer 1 according to the present exemplary embodiment, an exception is notified form the calculation node 6 to the control node 5 as described above by using an interrupt, for example. Handling an occurring exception has been described above in detail, and thus its description is omitted here.

When the handling of an occurring exception is initiated, occurrence of the exception is notified to the calculation node management process 52 on the control node 5, as described above. Upon receipt of the notification of the occurring exception, the calculation node management process 52 refers to the process association table 522 to obtain a calculation process ID based on the number for the calculation core 611 where the exception occurred. Accordingly, the calculation node management process 52 obtains, by referring to the calculation process DB 521, a proxy process 511 stored in association with the number for the calculation core 611 where the exception occurred. The subsequent processes are handled by the proxy process 511.

First, the proxy process 511 analyzes the argument written to its argument writing area 5111 to check whether a buffer needs to be transferred to execute the system call (Step S036).

If the proxy process 511 finds that a buffer needs to be transferred (Yes in Step S036), the proxy process 511 allocates a data buffer area 5112 within the proxy process 511 (Step S037). Then, the proxy process 511 instructs the data transfer circuit 33 (DMA engine function 331) to transfer the contents of the buffer in the process image 321 corresponding to the proxy process 511 to the data buffer area 5112 in the proxy process 511. In this way, the contents of a buffer is transferred from the calculation node 6 to the control node 5 (Step S038). Such transfer of buffer contents from the calculation node 6 to the control node 5 will be needed for a write system call, for example.

Upon completion of the above-described DMA transfer, or when the proxy process 511 finds no need to transfer a buffer (No in Step S036), the proxy process 511 invokes a system call toward the control node OS 50 (executes a function) (Step S039).

After invoking the system call, the proxy process 511 determines whether the contents of the buffer in the proxy process 511 needs to be transferred to the communication buffer area 3211 in the process image 321 corresponding to the proxy process 511 (Step S040).

If the buffer needs to be transferred (Yes in Step S040), the proxy process 511 instructs the data transfer circuit 33 (DMA engine 331) to transfer the buffer (Step S041). Such transfer of a buffer from the control node 5 to the calculation node 6 will be needed for a read system call, for example.

Upon completion of the above-described buffer transfer, or when the proxy process 511 determines it is not necessary to transfer the buffer (No in Step S040), the calculation node management process 52 writes a return value of the system call to the general-purpose registers group 6111 (Step S042). Note that the calculation node management process 52 writes the return value of the system call to the general-purpose registers group 6111 via the register groups accessing 6115 in the calculation core 611. In general ABIs, a return value of a system call is written to a general-purpose register in the same node. However, in the parallel computer 1, a return value of a system call is written from the control node 5 to the general-purpose registers group 6111 on the calculation node 6.

Then, the calculation core 611 resumes executing the program (Step S043). Operations performed by the calculation core 611 for starting execution of a program have been described above, and are thus omitted here.

Figure 12:
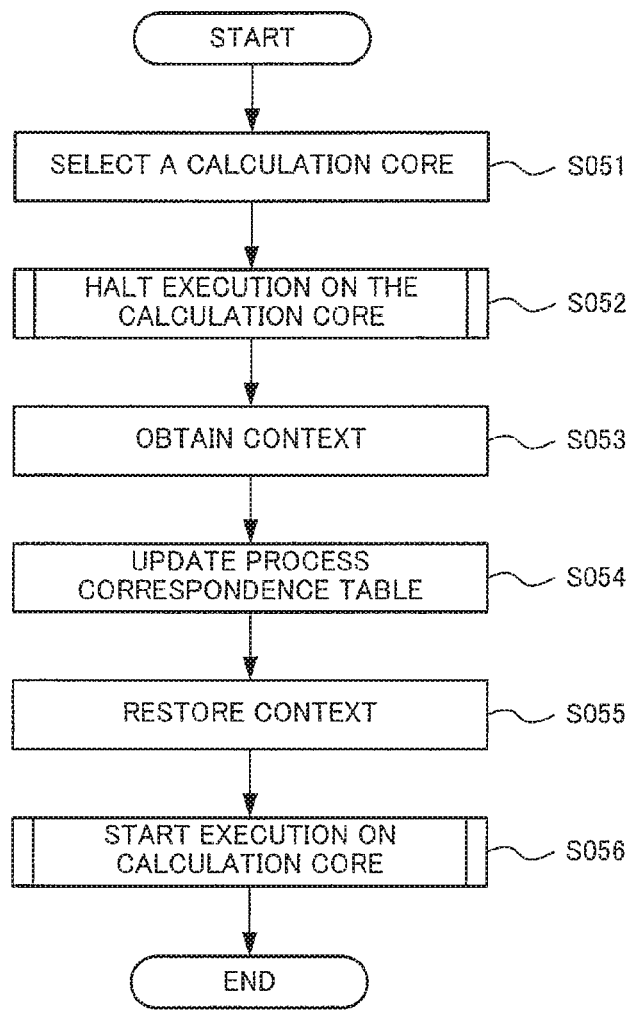
FIG. 12 is a flow chart showing operations performed when allocation of a calculation process to a calculation core is changed.

Operations of the parallel computer 1 performed during "4. Executing a process when the calculation process needs an OS service (system call)" have been described above. Next, operations of the parallel computer 1 performed during "5. Changing allocation of calculation processes to calculation cores (context switch)" are described below with reference to FIG. 12. FIG. 12 is a flow chart showing example operations for a context switch performed when the number of calculation processes is greater than the number of calculation cores 611.

First, the calculation node management process 52 in the control node 5 selects a calculation core 611 to be halted (Step S051). For example, every time a predetermined period has passed, the calculation node management process 52 selects a calculation core 611 to be halted. The calculation node management process 52 may use any method to make the selection of a calculation core 611 to be halted.

Next, the calculation node management process 52 halts the calculation core 611 selected in Step S051 as described above (Step S052). Operations for halting a calculation core 611 have already been described, and are thus omitted here.

Then, the calculation node management process 52 uses the register groups accessing unit 6115 in the halted calculation core 611 to access the general-purpose registers group 6111. The calculation node management process 52 then obtains the context 611A from the general-purpose registers group 6111 and stores the obtained context 611A in the calculation process DB 521 (Step S053).

During this operation, the calculation node management process 52 may make a copy of the process image 321 in the control node 5. Making such copy of the process image 321 in the control node 5 makes it possible to create process-by-process checkpoint data.

Then, the calculation node management process 52 updates the process association table 522 based on the ID of the calculation process that is going to run on the calculation core 611 next (Step S054). In the present exemplary embodiment, it is assumed that the ID of the calculation process to run on the calculation core 611 next is selected following an existing scheduling algorithm. The calculation node management process 52 needs only to be configured to be able to select a calculation process ID in some way.

Then, the calculation node management process 52 looks up the calculation process DB 521 based on the ID of the calculation process to run on the calculation core 611 next, and obtains register values (context) of the calculation process ID to run on the calculation core 611 next. The calculation node management process 52 stores, via the register groups accessing unit 6115, the obtained register values into the context 611A in the general-purpose registers group 6111 included in the calculation core 611 (Step S055).

If checkpoint data is contained in the calculation process to run on the calculation core 611 next, the process image 321 as of the time when the checkpoint data was obtained can be restored by transferring the calculation process to the calculation node at this timing.

After the context 611A is restored, the calculation node management process 52 starts execution on the calculation core where contexts have been switched (Step S056).

Figure 13:
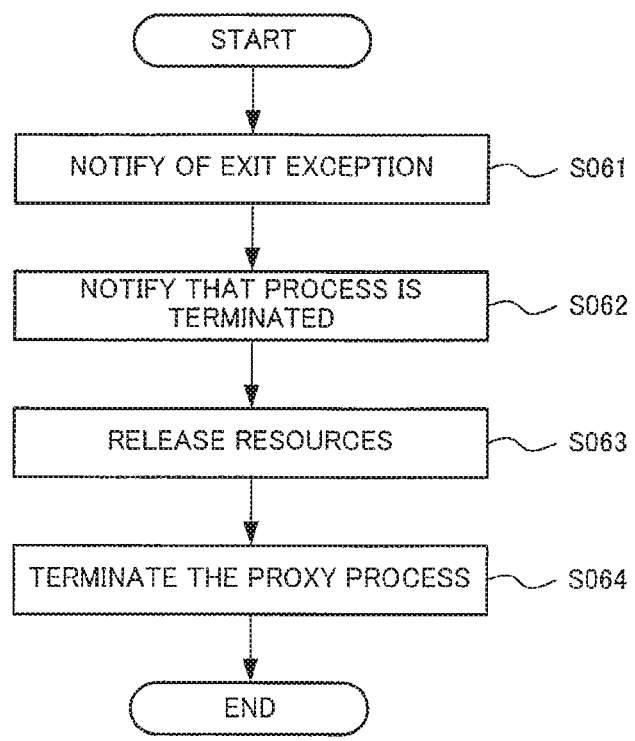
FIG. 13 is a flow chart showing operations performed when a calculation process is terminated.

Operations of the parallel computer 1 performed during "5. Changing allocation of calculation processes to calculation cores (context switch)" have been described above. Next, operations of the parallel computer 1 performed during "6. Terminating the calculation process (exit of the program)" are described below with reference to FIG. 13. FIG. 13 is a flow chart showing example operations performed for exiting the program running on the calculation node 6.

When the program running on the calculation core 611 is ended, the calculation core 611 first notifies the proxy process 511 of an exception for terminating the calculation process (Step S061). An exception for terminating the calculation process may be, for example, an exit system call or an exception related to memory access. Occurrence of an exception has been described above, and thus its description is omitted here.

Upon receipt of the notification of the exception, the proxy process 511 notifies the calculation node management process 52 that the calculation process is to be terminated (Step S062).

Upon receipt of the notification of termination of the calculation process, the calculation node management process 52 searches the process association table 522 to release any resource that has been used for the calculation process (Step S063). This terminates the calculation process.

Specifically, the calculation node management process 52 deletes the context 611A that is stored in the calculation process DB 521 and is associated with the proxy process 511 to be terminated. In addition, the calculation node management process 52 releases from the memory 32 the process image 321 corresponding to the proxy process 511 to be terminated. In case the context 611A corresponding to the proxy process 511 to be terminated is active in any calculation core 611 on the calculation node 6, the calculation node management process 52 may be configured to release such calculation core 611. In this case, the calculation node management process 52 may be configured to switch from the context of the released calculation core 611 to another context when releasing the calculation core 611.

After the calculation process is terminated, the proxy process 511 is terminated (Step S064).

Note that Steps S062, S063, and S064 may not take place in the order mentioned. For example, in an alternative configuration, the proxy process 511 may be terminated upon receipt of an exit system call invoked in Step S061. In this case, the calculation node management process 52 is notified that a calculation process is to be terminated, by, for example, releasing the handle that the proxy process 511 has held owing to functions of the control node OS 50. Upon receipt of the notification that the calculation process is to be terminated, the calculation node management process 52 releases resources of the calculation process and terminates it.

The parallel computer 1 goes through the operation flows described above. With these operations, the parallel computer 1 can employ calculation models, which are implemented in general computers, on the calculation node 6 where no OS is running. In the present exemplary embodiment described herein, the parallel computer 1 consists of one control node 5 and a plurality of calculation nodes 6. However, the parallel computer 1 may include a plurality of node groups each of which consists of one control node 5 and a plurality of calculation nodes 6. That is, the number of control nodes 5 is not necessarily limited to one.

As seen above, the parallel computer 1 according to the present exemplary embodiment includes a control node 5 where an OS is installed and a calculation node 6 where no OS is installed. On the control node 5, proxy processes 511 and the calculation node management process 52 are deployed. The calculation node 6 includes the general-purpose registers group 6111 and the control registers group 6112. Such configuration allows the control node 5 to manage operations of the calculation node 6. In other words, the parallel computer 1 can employ calculation models, which are implemented in general computers, on the calculation node 6 where no OS is running. As a result, the parallel computer 1 can solve the problems of OS jitter and cache pollution, which would be caused if an OS was running on the calculation node 6.

The above-described configurations allow the control node 5 to act as a proxy to control the I/O devices that require privileges. As a result, it is no longer necessary to write a device driver dedicated to the calculation node 6 as far as the control node 5 employs a configuration based on commodity hardware. Accordingly, the problems of loss of versatility and a increase in development cost can be solved.

The calculation core 611 according to the present exemplary embodiment includes the exception detection unit 6113 and the exception notification unit 6114. This configuration makes it possible to detect any exception process occurring when the calculation core 611 is executing an instruction and notify the control core 6, which has an OS, of the occurrence of the exception process. As a result, the calculation node 6 can halt execution of the calculation process where the exception process has occurred. The control node 5 has the capability to provide OS functions, such as system calls, to the calculation node. In other words, it is made possible to employ calculation models, which are implemented in general computers, on the calculation node 6 where no OS is running.

<Exemplary Embodiment 2>

Figure 14:
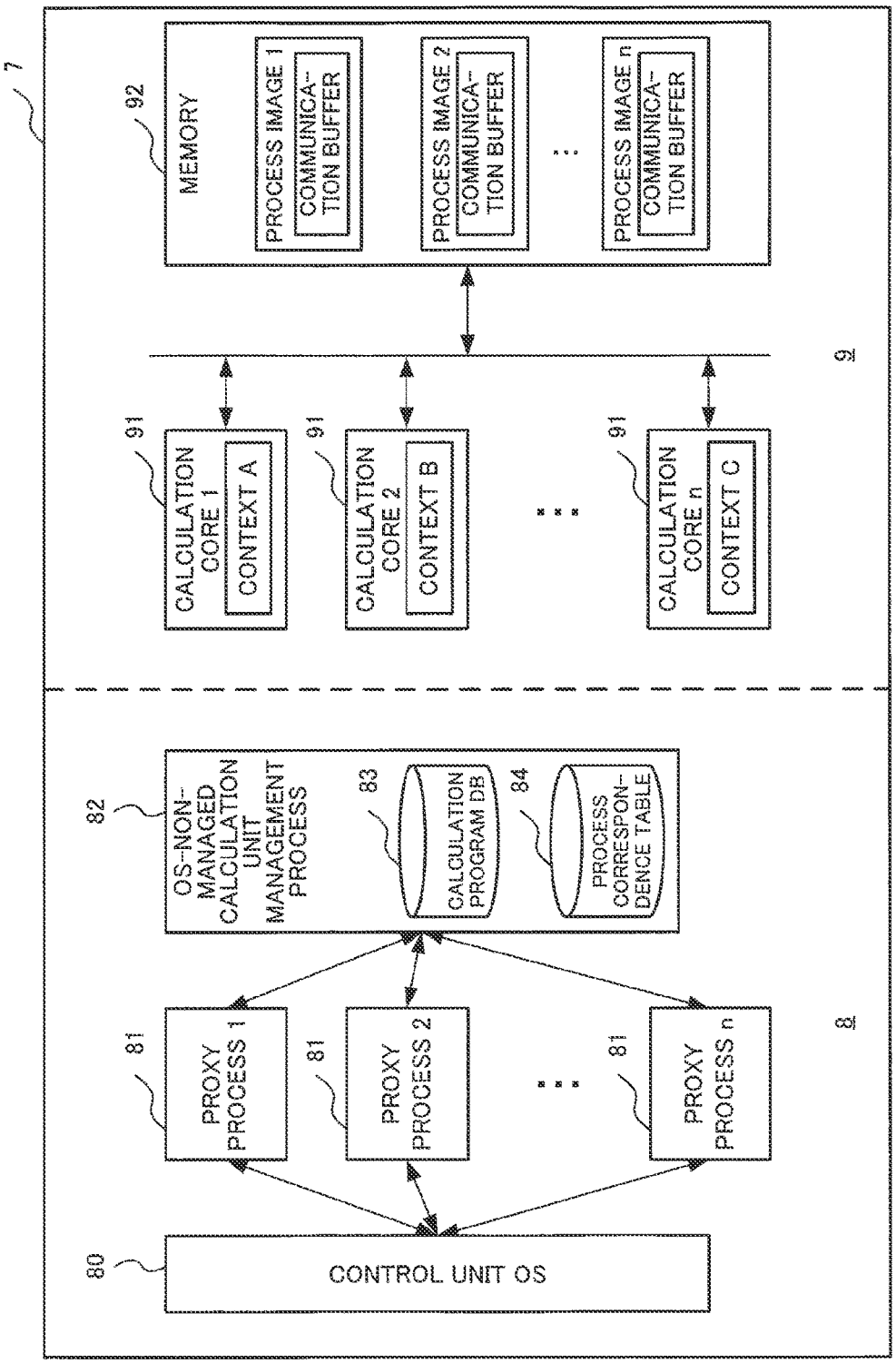
FIG. 14 is a block diagram illustrating a configuration of an information processing apparatus according to a second exemplary embodiment.

A second exemplary embodiment of the present invention will now be described with reference to FIG. 14. FIG. 14 is a block diagram illustrating a configuration of an information processing apparatus 7 according to the present exemplary embodiment.

Similarly to the first exemplary embodiment described above, the present exemplary embodiment includes a control unit (control node) having OS functions and a calculation unit (calculation node) having no OS functions. The present exemplary embodiment can be implemented as far as it includes an area where OS functions are active and another area where OS functions are inactive, even if it is not in accordance with the parallel computer 1 described in the first exemplary embodiment.

The following describes the information processing apparatus 7 according to the present exemplary embodiment, which apparatus includes two areas: an area under the control of an OS and an area outside of the control of an OS. The information processing apparatus 7 according to the present exemplary embodiment may be implemented by, for example, a semiconductor integrated circuit that includes these two areas.

As illustrated in FIG. 14, the information processing apparatus 7 according to the present exemplary embodiment is configured to include an OS-managed control unit 8 falling under the control of an OS and an OS-non-managed calculation unit 9 not falling under the control of an OS.

In the information processing apparatus 7 according to the present exemplary embodiment, the OS-managed control unit 8 and the OS-non-managed calculation unit 9 are each configured so that a calculation model implemented in general computers can be employed on the OS-non-managed calculation unit 9 where no OS is running (outside of the control of an OS). In the following description, the OS running on the OS-managed control unit 8 is called the control unit OS 80. As the control unit OS 80, a commodity OS such as Linux or Windows may be used. The OS-managed control unit 8 and the OS-non-managed calculation unit 9 are communicably connected with each other.

The configuration of the OS-managed control unit 8 is described below. The OS-managed control unit 8 is configured to include a not-illustrated storage apparatus (e.g., memory) and an processing apparatus (e.g., CPU). This OS-managed control unit 8 is the area falling under the control of the control unit OS 80, as described above. Accordingly, on the OS-managed control unit 8, any hardware (storage apparatus and processing apparatus) falling under its control can be virtualized. Thus, the following describes processes deployed on the OS-managed control unit 8. These processes can be implemented by reading and executing programs stored in the storage apparatus under the control of the OS-managed control unit 8, the reading and executing performed by the processing apparatus falling under the control of the OS-managed control unit 8.

As illustrated in FIG. 14, on the OS-managed control unit 8, the control unit OS 80 deploys proxy processes 81 and an OS-non-managed calculation unit management process 82. The OS-non-managed calculation unit management process 82 includes a calculation process DB 83 and a process association table 84. The proxy process 81 is configured in the same way as in the first exemplary embodiment. The OS-non-managed calculation unit management process 82 is equivalent to the calculation node management process in the first exemplary embodiment. Detail descriptions of the respective configurations are thus omitted here.

The configuration of the OS-managed control unit 8 has been described above. The configuration of the OS-non-managed calculation unit 9 is now described below.

As illustrated in FIG. 14, the OS-non-managed calculation unit 9 is configured to include calculation cores 91 and memory 92. The OS-non-managed calculation unit 9 also includes a data transfer circuit, which is not illustrated. The calculation core 91 is configured in the same way as in the first exemplary embodiment. The memory 92 and the data transfer circuit are also configured in the same way as in the first exemplary embodiment. Details of the respective configurations are thus omitted here.

The information processing apparatus 7 according to the present exemplary embodiment is configured as described above. This configuration allows the information processing apparatus 7 to operate in the same manner as in the first exemplary embodiment. Operations of the information processing apparatus 7 are the same as those in the first exemplary embodiment, and thus their descriptions are omitted.

The information processing apparatus 7 according to the present exemplary embodiment includes the OS-managed control unit 8 falling under the control of an OS and the OS-non-managed calculation unit 9 not falling under the control of an OS. On the OS-managed control unit 8, proxy processes 81 and the OS-non-managed calculation unit management process 82 are deployed. In addition, the OS-non-managed calculation unit 9 includes calculation cores 91. Consequently, the OS-non-managed calculation unit 9 can perform calculation processes as if it has OS functions. In other words, the information processing apparatus 7 can solve the problems of OS jitter and cache pollution, which would be caused if an OS was running on the OS-non-managed calculation unit 9.

Furthermore, the above configurations allow the OS-managed control unit 8 to act as a proxy of the OS-non-managed calculation unit 9 to control I/O devices that require privileges. As a result, it is no longer necessary to write a device driver dedicated to the OS-non-managed calculation unit 9 as far as the OS-managed control unit 8 employs a configuration based on commodity hardware. Accordingly, the problems of loss of versatility and a increase in development cost can be solved.

<Exemplary Embodiment 3>

Figure 15:
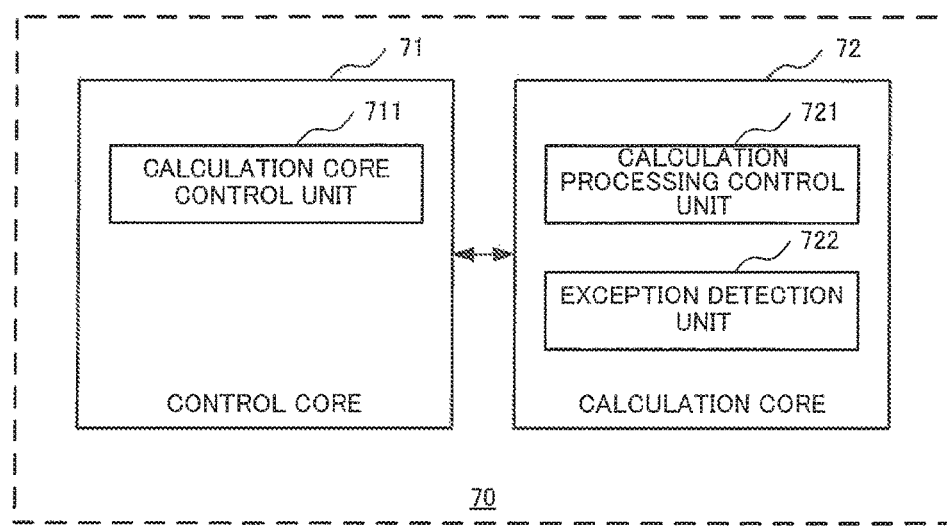
FIG. 15 is a block diagram illustrating a general configuration of an information processing apparatus according to a third exemplary embodiment.

A third exemplary embodiment of the present invention will now be described with reference to FIG. 15. FIG. 15 is a block diagram illustrating a general configuration of an information processing apparatus 70 according to the present exemplary embodiment.

As illustrated in FIG. 15, the information processing apparatus 70 according to the present exemplary embodiment is configured to include a control core 71 and a calculation core 72. The control core 71 includes a calculation core control unit 711. The calculation core 72 includes a calculation processing control unit 721 and an exception detection unit 722.

The control core 71 is an processing unit on which an operating system (OS) is installed. On the other hand, the calculation core 72 is an processing unit that performs a predetermined calculation process under the control of the control core 71. Specifically, there is no operating system installed on the calculation core 72.

The calculation core control unit 711 is the part which instructs an calculation core 72, which is in halt, to start a calculation process to be handled by the calculation core. As described later, when instructed to start a calculation process by the calculation core control unit 711, the calculation core 72 which is in halt, starts the calculation process.

The calculation processing control unit 721 is the part which controls the calculation core 72 so that the calculation core 72 instructs to start a calculation process in response to an instruction provided by the calculation core control unit 711 to start the calculation process. The exception detection unit 722 is the part which detects a preset exception process occurring during execution of a calculation process and halts the execution of the calculation process where the exception process has occurred. Preset exception processes may include, for example, arithmetic exceptions, exceptions related to memory access, and exceptions provided on general processors.

Once the calculation core 72 halts execution of a calculation process, it remains suspended without starting a new calculation process until instructed to start a calculation process again by the calculation core control unit 711 on the control core 71.

As seen above, the information processing apparatus 70 according to the present exemplary embodiment includes the control core 71 on which an OS is installed and the calculation core 72. The control core 71 includes the calculation core control unit 711 while the calculation core 72 includes the calculation processing control unit 721. This configuration allows the calculation core 72 to perform a predetermined calculation process under the control of the control core 71. In other words, the information processing apparatus 70 is enabled to perform a predetermined calculation process on the calculation core 72 where no OS is running. As a result, the information processing apparatus 70 can solve the problems of OS jitter and cache pollution, which would be caused if an OS was running on the calculation core 72.

Moreover, the above-described configurations allow the control core 71 to act as a proxy to control I/O devices that require privileges. As a result, it is no longer necessary to write a device driver dedicated to the calculation core 72 as far as the control core 71 employs a configuration based on commodity hardware. Accordingly, the problems of loss of versatility and a increase in development cost can be solved.

The calculation core 72 according to the present exemplary embodiment also includes an exception detection unit 722. This configuration allows the calculation core 72 to detect an exception process occurring during execution of a calculation process and halt the execution of the calculation process where the exception process has occurred. As a result, the information processing apparatus 70 is enabled to perform a predetermined calculation process more completely on the information processing apparatus 70 where no OS is running.

The above-described information processing apparatus can be realized by installing predetermined programs on the information processing apparatus. Specifically, such programs, being another exemplary embodiments of the present invention, are used for implementing the following processes (a) to (c) on the information processing apparatus. This information processing apparatus includes a control core on which an operating system is installed, as well as including at least one calculation core which is controlled by the control core and performs a predetermined calculation process.

(a) The process of instructing a calculation core, which is in halt, to start a calculation process to be handled by the calculation core;
(b) The process of controlling the calculation core so that the calculation core starts a calculation process in response to an instruction to start the calculation process; and
(c) The process of detecting a preset exception process occurring during execution of a calculation process and halting the execution of the calculation process where the exception process has occurred.

An information processing method implemented by the information processing apparatus operating as above includes staring, by the calculation core, a predetermined calculation process in response to an instruction provided by the control core to start the calculation process. The information processing method also includes, if a preset exception process occurs during execution of a calculation process by the calculation core, detecting the predefined exception and halting the calculation process where the exception process has occurred, the detecting and halting performed by the calculation core.

A program or an information processing method that involves the above-described configuration and represents another aspect of the invention can also achieve the abovementioned object of the present invention because the program and the method have the same effects as exerted by the above-described information processing apparatus.

<Exemplary Embodiment 4>

Figure 16:
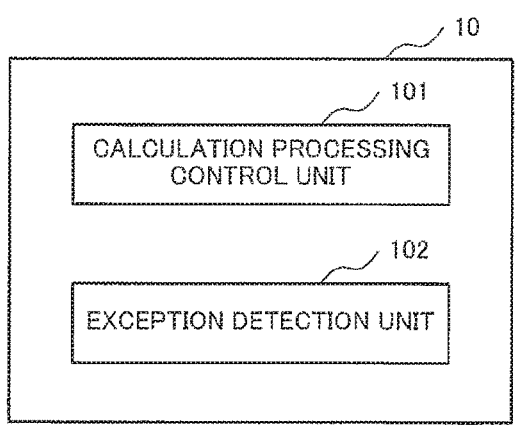
FIG. 16 is a block diagram illustrating a general configuration of a calculation processing apparatus according to a fourth exemplary embodiment.

A fourth exemplary embodiment of the present invention will now be described with reference to FIG. 16. FIG. 16 is a block diagram illustrating a general configuration of a calculation processing apparatus 10 according to the present exemplary embodiment.

The calculation processing apparatus 10 performs a predetermined calculation process under the control of an external apparatus. That is, no OS is installed on the calculation processing apparatus 10. As illustrated in FIG. 16, the calculation processing apparatus 10 according to the present exemplary embodiment includes a calculation processing control unit 101 and an exception detection unit 102.

The calculation processing control unit 101 is the part which controls the calculation processing apparatus so that the apparatus starts a calculation process in response to an instruction provided by an external apparatus to start the calculation process. The exception detection unit 102 is the part which detects a preset exception process occurring during execution of a calculation process. Preset exception processes may include, for example, arithmetic exceptions, exceptions related to memory access, and exceptions provided on general processors.

The calculation processing apparatus 10 is configured to halt execution of a calculation process where an exception process has occurred when the exception detection unit 102 detects the exception process. Once the calculation processing apparatus 10 halts execution of a calculation process, it remains suspended without starting a calculation process until instructed to start a calculation process again by an external apparatus.

As seen above, the calculation processing apparatus 10 according to the present exemplary embodiment starts a calculation process in response to an instruction provided by an external apparatus to start the calculation process. The calculation processing apparatus 10 includes the calculation processing control unit 101. This configuration enables the calculation processing apparatus 10 to perform, in spite of no OS installed, a predetermined calculation process under the control of an external apparatus. As a result, the calculation processing apparatus 10 can solve the problems of OS jitter and cache pollution, which would be caused if an OS was running on the calculation processing apparatus 10.

The calculation processing apparatus 10 according to the present exemplary embodiment also includes the exception detection unit 102.

This configuration enables the calculation processing apparatus 10 to detect an exception process occurring during execution of a calculation process and halt the execution of the calculation process where the exception process has occurred. In other words, the calculation processing apparatus 10 is enabled to perform a predetermined calculation process more completely on the calculation processing apparatus 10 where no OS is running.

The above-described calculation processing apparatus can be realized by installing predetermined programs on the calculation processing apparatus. Specifically, such programs, being another exemplary embodiment of the present invention, implement the processes of: controlling the calculation processing apparatus so that the apparatus starts a calculation process in response to an instruction provided by an external apparatus to start the calculation process; and detecting a preset exception process occurring during execution of a calculation process. Such programs also have a function to, upon detection of an exception process, halt execution of the calculation process where the exception process has occurred.

A calculation processing method implemented by the calculation processing apparatus operating as above includes: starting a predetermined calculation process in response to an instruction provided by an external apparatus to start the calculation process; detecting, when a preset exception process occurs during execution of a calculation process, the exception process; and halting the calculation process where the exception process has occurred.

A program or an information processing method that involves the above-described configuration and represents another aspect of the invention can also achieve the above-mentioned object of the present invention because the program and the method have the same effects as exerted by the above-described information processing apparatus.

<Supplemental Note>

The whole or part of the above exemplary embodiments can be described as the following supplemental notes. The information processing apparatus and other aspects of the present invention are now described below in outline. It should be noted that, however, the present invention is not limited to the following configurations.

(Supplemental Note 1)

An information processing apparatus including:

a control core on which an operating system is installed; and at least one calculation core which is controlled by the control core and performs a predetermined calculation process, wherein the control core includes calculation core control means for instructing the calculation core, which is in halt, to start the calculation process to be performed by calculation core, and wherein the calculation core includes:

calculation processing control means for controlling the calculation core so that the calculation core starts the calculation process in response to an instruction, which is provided by the calculation core control means, to start the calculation process; and exception detection means for detecting a preset exception process occurring during execution of the calculation process and halting the calculation process in which the exception process has occurred.

With above configuration, the information processing apparatus includes a control core, on which an operating system is installed, and at least one calculation core which is controlled by the control core and performs a predetermined calculation process. The control core includes calculation core control means. The calculation core includes calculation processing control means. With this configuration, a predetermined calculation process can be executed on the calculation core where an OS is not running. Therefore, the information apparatus is able to solve the problems of OS jitter and cache pollution, which may be caused by operation of OS in the calculation core executing the calculation process.

With this configuration, the calculation core includes exception detection means. The calculation core is able to detect an exception process occurring during execution of the calculation process, and halt the calculation process in which the exception process has occurred, by this configuration. As a result, the information apparatus is able to execute predetermined calculation process more completely on the information processing apparatus where OS is not running.

(Supplemental Note 2)

The information processing apparatus according to Supplemental Note 1, wherein the calculation core control means instructs the calculation core to start the calculation process in response to the exception process detected by the exception detection means, and wherein, when an instruction to start the calculation process is provided by the calculation core control means, the calculation processing control means controls the calculation core so that the calculation core starts the calculation process.

With this configuration, the control core of the information apparatus is configured to instruct the calculation core to start the calculation process in response to the exception process detected by the exception detection means. Therefore, the information apparatus is able to execute predetermined calculation process more completely on the information processing apparatus where OS is not running.

(Supplemental Note 3)

The information processing apparatus according to Supplemental Note 2, wherein the exception detection means notifies the control core that the exception detection means detected the exception process, and wherein the calculation core control means instructs the calculation core to start the calculation process in response to the exception process indicated by the notification received from the exception detection means.

With this configuration the calculation core if configured to notify the exception to the control core, then the exception has detected. Therefore, the information apparatus is able to execute predetermined calculation process more completely on the information processing apparatus where OS is not running.

(Supplemental Note 4)

The information processing apparatus according to any one of Supplemental Notes 1 to 3, wherein the calculation core further includes data transfer means for transferring data to the control core, the data being necessary for handling the exception process detected by the exception detection means, and wherein the control core further includes proxy exception handling means for handling, as a proxy of the calculation core, the exception process using the data transferred by the data transfer means.

With this configuration, the calculation core includes the data transfer means, and the control core includes exception handling means. The calculation core is able to handle exception process, by this configuration. As a result the control core can handle the processing of system calls, as a proxy of the calculation core.

(Supplemental Note 5)

The information processing apparatus according to Supplemental Note 4, wherein, when the exception process occurring on the calculation core is a system call, the data transfer means transfers data necessary for handling the system call to a buffer area which is included in the proxy exception handling means on the control core.

The information processing apparatus according to any one of Supplemental Notes 1 to 5, wherein the calculation core control means is configured to be able to instruct the calculation core to halt the calculation process performed by the calculation core, and to be able to instruct the calculation core, which is halting the calculation process, to change contents of the calculation process to be performed by the calculation core, and wherein the calculation processing control means controls the calculation core so that the calculation core halts the calculation process being executed, in response to an instruction to halt the calculation process, the instruction being provided by the calculation core control means, and changes contents of the calculation process to be performed by the calculation core, in response to an instruction to change contents of the calculation process, the instruction being provided by the calculation core control means.

With this configuration, the control core is configured to instruct calculation core to halt the calculation process and to change the calculation process. The calculation is able to halt and change the calculation process in response to the instructions from the control core. As a result, the information processing apparatus is able to execute context switching.

(Supplemental Note 7)

The information processing apparatus according to Supplemental Note 6, wherein, when the number of the calculation processes to be performed by the calculation cores is greater than the number of the calculation cores, the calculation core control means selects, at predetermined time intervals and based on predetermined criteria, the calculation core which is executing the calculation process; instructs the selected calculation core to halt the calculation process; and changes contents of the calculation process to be performed by the calculation core which has halted the calculation process.

(Supplemental Note 8)

A computer-readable recording medium recording a program which causes a computer including an information processing apparatus, which includes: a control core on which an operating system is installed; and at least one calculation core which is controlled by the control core and which performs a predetermined calculation process, to perform:

a calculation core control process of instructing the calculation core, which is in halt, to start the calculation process to be performed by the calculation core;

a calculation processing control process of controlling the calculation core so that the calculation core starts the calculation process in response to an instruction to start the calculation process; and an exception detection process of detecting a preset exception process occurring during execution of the calculation process and halting execution of the calculation process in which the exception process has occurred.

(Supplemental Note 8-1)

The recording medium according to Supplemental Note 8, wherein the calculation core control process includes a process of instructing the calculation core to start the calculation process, in response to the exception process which is detected by the exception detection process.

(Supplemental Note 9)

The recording medium according to Supplemental Note 8, wherein the exception detection process includes a process of notifying the control core that the exception process has been detected.

(Supplemental Note 10)

The recording medium according to Supplemental Note 9, wherein the recording medium records the program which causes the computer further to perform:

a data transfer process of transferring data necessary for handling the detected exception process to the control core; and a proxy exception handling process of handling, as a proxy of the calculation core, the exception process using the transferred data.

(Supplemental Note 10-1)

The recording medium according to Supplemental Note 10, wherein the data transfer process includes a process of transferring data necessary for handling a system call, to a buffer area which is included in the control core, when the when the exception process occurring on the calculation core is the system call.

(Supplemental Note 11)

The recording medium according to any one of Supplemental Note 8 to 10, wherein the calculation core control process includes:

a process of instructing the calculation core to halt the calculation process performed by the calculation core, and changing, with respect to the calculation core, which is halting the calculation process, contents of the calculation process to be performed by the calculation core, and wherein the calculation processing control process includes:

a process of halting the calculation process being executed, in response to an instruction to halt the calculation process, the instruction being provided by the calculation core control process; and a process of changing contents of the calculation process to be performed by the calculation core, in response to an instruction to change contents of the calculation process, the instruction being provided by the calculation core control process.

(Supplemental Note 11-1)

The recording medium according to any one of Supplemental Note 11, wherein wherein, when the number of the calculation processes to be performed by the calculation cores is greater than the number of the calculation cores, the calculation core control process includes a process for:

selecting, at predetermined time intervals and based on predetermined criteria, the calculation core which is executing the calculation process;

instructing the selected calculation core to halt the calculation process; and changing contents of the calculation process to be performed by the calculation core.

(Supplemental Note 12)

An information processing method including:

starting, by a calculation core, a calculation process that is predetermined in response to an instruction provided by a control core to start the calculation process; and when a preset exception process occurs during execution of the calculation process performed by the calculation core, detecting, by the calculation core, the exception process, and halting, by the calculation core, the calculation process in which the exception process has occurred.

(Supplemental Note 13)

The information processing method according to Supplemental Note 12, wherein, when the exception process has been detected, the calculation core notifies the control core that the exception process has been detected.

(Supplemental Note 14)

The information processing method according to Supplemental Note 13, wherein the calculation core transfers data necessary for handling the exception process, to the control core, and wherein the control core handles the exception process, as a proxy of the calculation core, using the transferred data.

(Supplemental Note 15)

The information processing method according to any one of Supplemental Note 12 to 14, wherein the control core provides the calculation core, which is halting the calculation process, with an instruction to change contents of the calculation process to be performed by the calculation core, and wherein the calculation core changes contents of the calculation process to be performed by the calculation core, in response to the instruction to change contents of the calculation process.

(Supplemental Note 15-1)

The information processing method according to any one of Supplemental Note 15, wherein wherein, when the number of the calculation processes to be performed by the calculation cores is greater than the number of the calculation cores, selecting, at predetermined time intervals and based on predetermined criteria, the calculation core which is executing the calculation process;

instructing the selected calculation core to halt the calculation process; and changing contents of the calculation process to be performed by the calculation core.

(Supplemental Note 16)

A calculation processing apparatus which performs a predetermined calculation process under control of an external apparatus, the calculation processing apparatus including:

calculation processing control means for controlling the calculation processing apparatus so that the calculation processing apparatus starts a calculation process, in response to an instruction provided by the external apparatus to start the calculation process; and exception detection means for detecting a preset exception process occurring during execution of the calculation process and halting execution of the calculation process in which the exception process has occurred.

(Supplemental Note 17)

The calculation processing apparatus according to Supplemental Note 16, wherein the exception detection means notifies the external apparatus that the exception detection means has detected the exception process.

(Supplemental Note 18)

The calculation processing apparatus according to Supplemental Note 16 or 17, further including:

data transfer means for transferring data to the external apparatus, the data being necessary for handling the exception process detected by the exception detection means.

(Supplemental Note 19)

The calculation processing apparatus according to any one of Supplemental Notes 16 to 18, wherein the calculation processing control means:

controls the calculation processing apparatus so that the calculation processing apparatus halts the calculation process being executed, in response to an instruction to halt the calculation process, the instruction being provided by the external apparatus; and changes contents of the calculation process to be performed by the calculation processing apparatus, in response to an instruction to change contents of the calculation process, the instruction being provided by the external apparatus.

(Supplemental Note 20)

A computer-readable storage medium storing a program which causes a calculation processing apparatus to perform:

a calculation processing control process of controlling the calculation processing apparatus so that the calculation processing apparatus starts, in response to an instruction provided by an external apparatus to start a calculation process, the calculation process; and an exception detection process of detecting a preset exception process occurring during execution of the calculation process and halting execution of the calculation process in which the exception process has occurred.

(Supplemental Note 21)

The storage medium according to Supplemental Note 20, wherein the exception detection process includes a process of notifying the external apparatus that the exception process has been detected.

(Supplemental Note 22)

The storage medium according to Supplemental Note 20 or 21, wherein the medium records the program which causes the calculation processing apparatus further to perform:

a data transfer process of transferring data necessary for handling the detected exception process to the external apparatus.

(Supplemental Note 23)

The storage medium according to any one of Supplemental Note 20 to 22, wherein the calculation processing control process includes:

a process of halting the calculation process being executed, in response to an instruction to halt the calculation process, the instruction being provided by the external apparatus; and a process of changing contents of the calculation process to be performed by the calculation core, in response to an instruction to change contents of the calculation process, the instruction being provided by the external apparatus.

(Supplemental Note 24)

A calculation processing method includes:

starting a calculation process that is predetermined, in response to an instruction provided by an external apparatus to start the calculation process; and when a preset exception process occurs during execution of the calculation process, detecting the exception process and halting the calculation process in which the exception process has occurred.

(Supplemental Note 25)

The calculation processing method according to Supplemental Note 24, including:

when the exception process is detected, notifying the external apparatus that the exception process has been detected.

(Supplemental Note 26)

The calculation processing method according to Supplemental Note 25, including:

when the exception process is detected, transferring data necessary for handling the exception process to the control core.

The program described in any of the above exemplary embodiments and supplemental notes is stored in a storage apparatus or recorded in a computer-readable recording medium. The recording medium may be, for example, a portable medium such as a flexible disk, optical disk, magneto-optical disk, or semiconductor memory.

The present invention has been explained above with the above-described exemplary embodiments as exemplary examples. However, the present invention is not limited to the above-described exemplary embodiments. In other words, various aspects of the present invention that could be understood by those skilled in the art may be applied within the scope of the present invention.

The present application claims priority based on Japanese Patent Application No. 2013-232197 filed on Nov. 8, 2013, the entire disclosure of which is incorporated herein.

REFERENCE SIGNS LIST

1 Parallel computer
2, 3 Node
21, 31 CPU
211, 311 Processor core
22, 32 Memory
321 Process image
3211 Communication buffer area
23, 33 Data transfer circuit
231, 331 DMA engine function
232, 332 CPU-directed communication function
4 Internode communication device
5 Control node
511 Proxy process
5111 Argument writing area
5112 Data buffer area
52 Calculation node management process
521 Calculation process DB
522 Process association table
6 Calculation node
611 Calculation core
611A Context
6111 General-purpose registers group
6112 Control registers group
6113 Exception detection unit
6114 Exception notification unit
6115 Register groups accessing unit
7, 70 Information processing apparatus
71 Control core
711 Calculation core control unit
72 Calculation core
721 Calculation processing control unit
722 Exception detection unit
8 OS-managed control unit
80 Control OS
81 Proxy process
82 OS-non-managed calculation unit management process
9 OS-non-managed calculation unit
91 Calculation core
92 Memory
10 Calculation processing apparatus
101 Calculation processing control unit
102 Exception detection unit

The invention claimed is:

1. An information processing apparatus, comprising:
a control core processor including a calculation core control program, wherein the calculation core control program, executed by the control core processor, is configured to
instruct a calculation core processor, which is in halt, to start a calculation process to be performed by the calculation core processor, and
the calculation core processor including:
a calculation processing control program, executed by the calculation core processor, that is configured to control the calculation core processor so that the calculation core processor starts the calculation process in response to an instruction, which is provided by the calculation core control program, to start the calculation process; and
an exception detection program, executed by the calculation core processor, that is configured to:
detect an occurrence of a preset exception process during execution of the calculation process, and
halt the calculation process in which the exception process occurs, wherein:
the calculation core control program is configured to instruct the calculation core to start the calculation process in response to detecting the exception process, and
when the instruction to start the calculation process is provided by the calculation core control program, the calculation processing control program is configured to control the calculation core processor so that the calculation core processor starts the calculation process.

2. The information processing apparatus according to claim 1,
wherein the exception detection program is configured to notify the control core processor that the exception detection program detects the exception process,
wherein the calculation core control program is configured to instruct the calculation core processor to start the calculation process in response to the exception process indicated by the notification received from the exception detection program.

3. The information processing apparatus according to claim 1, wherein:
the calculation core control program is configured to
instruct the calculation core processor to halt the calculation process performed by the calculation core processor, and
instruct the calculation core processor, which is halting the calculation process, to change contents of the calculation process to be performed by the calculation core processor, and
the calculation processing control program is configured to control the calculation core processor so that the calculation core processor is configured to:
halt the calculation process being executed, in response to receiving an instruction to halt the calculation process, the instruction being provided by the calculation core control program, and
change contents of the calculation process to be performed by the calculation core processor, in response to receiving an instruction to change contents of the calculation process, the instruction being provided by the calculation core control program.

4. The information processing apparatus according to claim 3,
wherein, when a number of calculation processes to be performed by calculation core processors is greater than a number of the calculation core processors, the calculation core control program is configured to:
select, at predetermined time intervals and based on predetermined criteria, the calculation core processor which is executing the calculation process;
instruct the selected calculation core processor to halt the calculation process; and
change contents of the calculation process to be performed by the calculation core processor which has halted the calculation process.

5. A non-transitory computer-readable recording medium storing a program that, when executed by an information processing apparatus including a control core and a calculation core configured to perform a predetermined calculation process, causes the information processing apparatus to perform a method, the method comprising:

a calculation core control process that instructs the calculation core, which is in halt, to start the calculation process to be performed by the calculation core;

a calculation processing control process that controls the calculation core so that the calculation core starts the calculation process in response to an instruction to start the calculation process; and an exception detection process that detects an occurrence of a preset exception process during execution of the calculation process and halts the execution of the calculation process in which the exception process occurs, wherein:

the calculation core control process instructs the calculation core to start the calculation process in response to detecting the exception process by the exception detection process, and when the instruction to start the calculation process is provided by the calculation core control process, the calculation processing control process controls the calculation core so that the calculation core starts the calculation process.

6. The non-transitory recording medium according to claim 5, wherein the exception detection process comprises a process that notifies the control core that the exception process is detected.

7. The non-transitory recording medium according to claim 6, wherein the method further comprises:

a data transfer process that transfers data necessary for handling the detected exception process to the control core; and a proxy exception handling process that handles, as a proxy of the calculation core, the exception process using the transferred data.

8. The non-transitory recording medium according to claim 5, wherein:

the calculation core control process comprises:

a first process that instructs the calculation core to halt the calculation process performed by the calculation core, and changes, with respect to the calculation core that is halting the calculation process, contents of the calculation process to be performed by the calculation core, and the calculation processing control process comprises:

a second process that halts the calculation process being executed, in response to receiving an instruction to halt the calculation process, the instruction being provided by the calculation core control process; and a third process that changes contents of the calculation process to be performed by the calculation core, in response to receiving an instruction to change contents of the calculation process, the instruction being provided by the calculation core control process.

9. An information processing method, comprising:

starting, by a calculation core, a calculation process that is predetermined in response to receiving an instruction provided by a control core to start the calculation process; and when a preset exception process occurs during execution of the calculation process performed by the calculation core, detecting, by the calculation core, the exception process, and halting, by the calculation core, the calculation process in which the exception process occurs, wherein when the exception process is detected, the calculation core is configured to notify the control core that the exception process is detected, the calculation core is configured to transfer data necessary for handling the exception process, to the control core, and the control core is configured to handle the exception process, as a proxy of the calculation core, using the transferred data.

10. The information processing method according to claim 9, wherein:

the control core is configured to provide the calculation core, which is halting the calculation process, with an instruction to change contents of the calculation process to be performed by the calculation core, and the calculation core is configured to change contents of the calculation process to be performed by the calculation core, in response to receiving the instruction to change contents of the calculation process.

11. A non-transitory computer-readable storage medium storing a program that, when executed by a calculation processing apparatus, causes the calculation processing apparatus to perform a method, the method comprising:

a calculation processing control process that controls the calculation processing apparatus so that the calculation processing apparatus starts, in response to receiving an instruction provided by an external apparatus to start a calculation process, the calculation process; and an exception detection process that detects a preset exception process occurring during execution of the calculation process and halts the execution of the calculation process in which the exception process occurs; and a data transfer process that transfers data to the external apparatus, the data being necessary for handling the exception process detected by the exception detection unit, wherein:

the exception detection process notifies the external apparatus that the exception detection unit detects the exception process, and the data transfer process transfers the data necessary for handling the exception process to the external apparatus to enable the external apparatus to handle the exception process, as a proxy of the calculation processing apparatus, using the transferred data.

12. The non-transitory computer-readable storage medium according to claim 11, wherein the exception detection process comprises a process that notifies the external apparatus that the exception process is detected.

13. The non-transitory computer-readable storage medium according to claim 11, wherein the method further comprises:

a data transfer process that transfers data necessary for handling the detected exception process to the external apparatus.

14. The non-transitory computer-readable storage medium according to claim 11, wherein the calculation processing control process comprises:

a first process that halts the calculation process that is executed in response to receiving an instruction to halt the calculation process, the instruction being provided by the external apparatus; and a second process that changes contents of the calculation process to be performed by the calculation processing apparatus in response to receiving an instruction to change contents of the calculation process, the instruction being provided by the external apparatus.

15. A calculation processing method for a calculation processing apparatus, the calculation processing method comprising:

starting a calculation process that is predetermined, in response to an instruction provided by an external apparatus to start the calculation process; and when a preset exception process occurs during execution of the calculation process, detecting the exception process and halting the calculation process in which the exception process occurs, wherein when the exception process is detected, the calculation processing method further comprises:

notifying the external apparatus that the exception process is detected, and transferring data necessary for handling the exception process to the external apparatus so as to enable the external apparatus to handle the exception process, as a proxy of the calculation processing apparatus, using the transferred data.

* * * * *